US011460558B2

(12) United States Patent
East-Lavoie et al.

(10) Patent No.: US 11,460,558 B2
(45) Date of Patent: Oct. 4, 2022

(54) SECOND-ORDER DETECTION METHOD AND SYSTEM FOR OPTICAL RANGING APPLICATIONS

(71) Applicant: UNIVERSITÉ LAVAL, Quebec (CA)

(72) Inventors: Simon East-Lavoie, Saint-Jean-Port-Joli (CA); Dominique Grenier, Quebec (CA)

(*) Notice: Subject to any disclaimer, the term of this patent is extended or adjusted under 35 U.S.C. 154(b) by 497 days.

(21) Appl. No.: 16/632,308

(22) PCT Filed: Jul. 20, 2018

(86) PCT No.: PCT/CA2018/050880
§ 371 (c)(1),
(2) Date: Jan. 17, 2020

(87) PCT Pub. No.: WO2019/014771
PCT Pub. Date: Jan. 24, 2019

(65) Prior Publication Data
US 2020/0166616 A1    May 28, 2020

Related U.S. Application Data

(60) Provisional application No. 62/534,834, filed on Jul. 20, 2017.

(51) Int. Cl.
*G01S 7/4865*    (2020.01)
*G01S 17/10*    (2020.01)
*H04B 1/12*    (2006.01)

(52) U.S. Cl.
CPC ............ *G01S 7/4865* (2013.01); *G01S 17/10* (2013.01); *H04B 1/123* (2013.01)

(58) Field of Classification Search
CPC ........ G01S 7/4865; G01S 17/10; H04B 1/123
See application file for complete search history.

(56) References Cited

U.S. PATENT DOCUMENTS 5,525,997 A    6/1996    Kwon
8,799,345 B1   8/2014    Liou et al.
(Continued)

FOREIGN PATENT DOCUMENTS

CN    104035074 B    2/2017
JP    2007333404 A   12/2007
(Continued)

OTHER PUBLICATIONS

Van Der Heijden, Ferdinand et al. "Time-of-flight estimation based on covariance models". Measurement Science and Technology, 14 (2003), pp. 1295-1304.
(Continued)

*Primary Examiner* — Thanh Luu
*Assistant Examiner* — Monica T Taba
(74) *Attorney, Agent, or Firm* — Dinsmore & Shohl LLP

(57) ABSTRACT

A method and system for detecting and ranging targets within a scene are provided. The method can include emitting an emission signal onto the scene and receiving a return signal including echoes produced by reflection of the emission signal from the targets. The method can also include digitizing the return signal into a digital signal waveform including N real-valued samples representing the return signal at N sequential sampling times. The method can further include creating, from the digital signal waveform, an N×N second-order signal matrix having a main diagonal whose $n^{th}$ element is expressed in terms of the square of the $n^{th}$ sample of the digital signal waveform. The method can also include deriving, based on the signal matrix, time-of-flight information associated with the echoes and indicative of range information associated with the targets. The method and system can be used, for example, in lidar-based remote sensing applications.

52 Claims, 10 Drawing Sheets

(56) References Cited

U.S. PATENT DOCUMENTS

| | | | |
|---|---|---|---|
| 2009/0304246 A1* | 12/2009 | Walker | G01S 7/52034 |
| | | | 382/128 |
| 2014/0211194 A1 | 7/2014 | Pacala et al. | |
| 2014/0364733 A1 | 12/2014 | Huang et al. | |
| 2014/0364738 A1 | 12/2014 | Huang et al. | |

FOREIGN PATENT DOCUMENTS

| | | | | |
|---|---|---|---|---|
| WO | 9200584 A1 | 1/1992 | | |
| WO | WO-2007022927 A1 * | 3/2007 | | G01S 17/006 |

OTHER PUBLICATIONS

East-Lavoie, Simon. "Adaptation d'un algorythme de deuxième ordre pour la déetection de pulse sans information de quadrature par le principe du temps de vol". Mémoire de maitrise. Québec : Université Laval, 2015.

International Preliminary Report on Patentability for patent application No. PCT/CA2018/050880 dated Nov. 12, 2019.

* cited by examiner

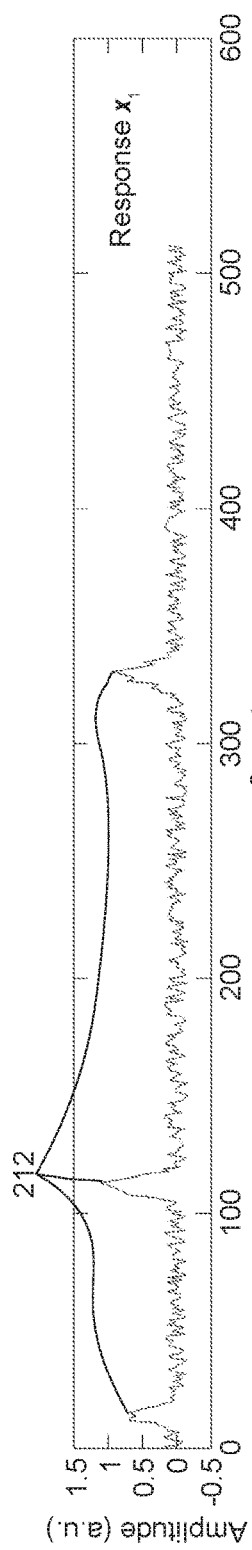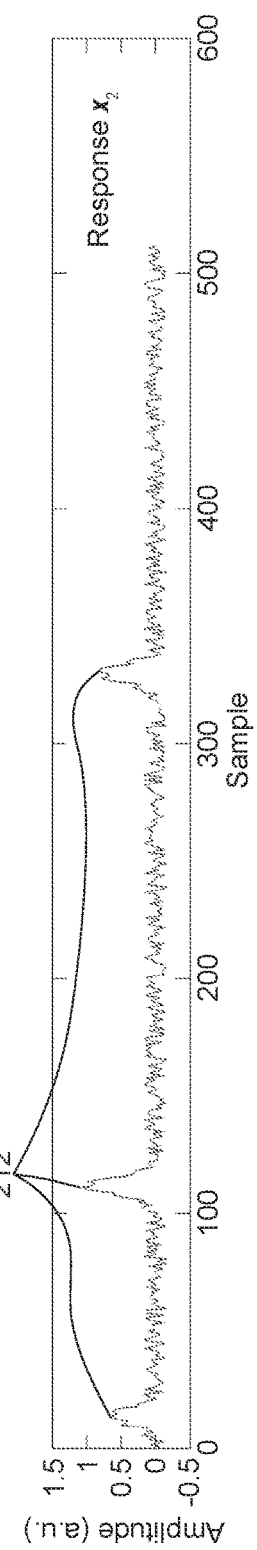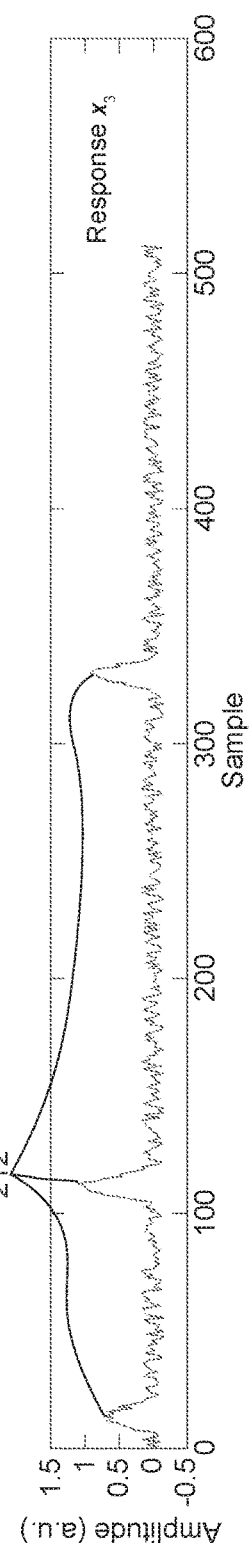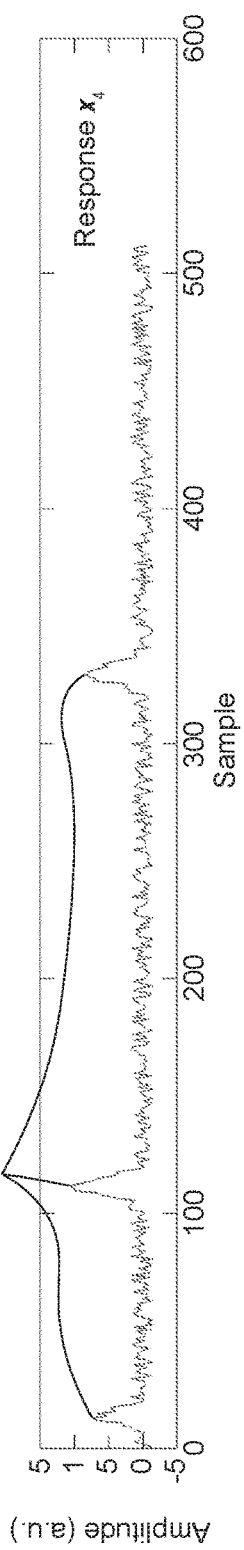
FIG. 4A
FIG. 4B
FIG. 4C
FIG. 4D

SECOND-ORDER DETECTION METHOD AND SYSTEM FOR OPTICAL RANGING APPLICATIONS

RELATED PATENT APPLICATIONS

The present application is a national stage application under 35 U.S.C. § 371 of International Application No. PCT/CA2018/050880, filed Jul. 20, 2018, and which claims priority from U.S. Provisional Application No. 62/534,834, filed Jul. 20, 2017. The above-referenced applications are hereby incorporated by reference into the present application in their entirety.

TECHNICAL FIELD

The technical field generally relates to remote sensing and signal detection, and more particularly to a second-order detection method and system for ranging and remote sensing applications, for example lidar-based and other optical ranging applications.

BACKGROUND

Optical ranging systems such as lidar systems are known in the art. Using the time-of-flight (TOF) principle, lidar systems are configured to measure the time required for a pulsed optical signal to travel from a transmitter to a target and back to a receiver, and then determine the range to the target—that is, the distance between the target and the lidar system itself—by multiplying the speed of light by half the round-trip time thus measured. While existing lidar systems have certain advantages, they also have some drawbacks and limitations, notably in terms of distinguishing targets producing overlapping echoes with satisfactory precision and immunity to noise. Challenges therefore remain in the field of lidar systems.

SUMMARY

The present description generally relates to second-order detection methods and systems for time-of-flight-based ranging applications, for example lidar applications.

In accordance with an aspect, there is provided a method for detecting and ranging one or more targets within a scene, the method including:
  emitting, from an emitter, at least one emission signal onto the scene, each emission signal having a respective emission time;
  receiving, by a receiver, at least one return signal in response to the at least one emission signal, each return signal including one or more echoes to be detected produced by reflection of the respective emission signal from the one or more targets; and
  converting, by an analog-to-digital converter, the at least one return signal into at least one respective digital signal waveform, each digital signal waveform including a set of N real-valued samples representing the respective return signal at a set of N sequential sampling times elapsed after the emission time of the respective emission signal;
  creating, by a processor, a second-order signal matrix of size N×N from the at least one digital signal waveform, the second-order signal matrix having a main diagonal whose $n^{th}$ element is expressed in terms of the square of the $n^{th}$ sample of each digital signal waveform, where n is an integer ranging from 1 to N; and
  deriving, by the processor, time-of-flight information associated with the one or more echoes based on the second-order signal matrix, the time-of-flight information being indicative of range information associated with the one or more targets.

In accordance with another aspect, there is provided a computer-implemented method for detecting and ranging one or more targets within a scene, the method including:
  receiving, by a processor, at least one digital signal waveform digitized from at least one respective return signal received in response to at least one emission signal emitted onto the scene, each at a respective emission time, each return signal including one or more echoes to be detected produced by reflection of the respective at least one emission signal from the one or more targets, each digital signal waveform including a set of N real-valued samples representing the respective return signal at a set of N sequential sampling times elapsed after the emission time of the respective emission signal;
  creating, by the processor, a second-order signal matrix of size N×N from the at least one digital signal waveform, the second-order signal matrix having a main diagonal whose $n^{th}$ element is expressed in terms of the square of the $n^{th}$ sample of each digital signal waveform, where n is an integer ranging from 1 to N; and
  deriving, by the processor, time-of-flight information associated with the one or more echoes based on the second-order signal matrix, the time-of-flight information being indicative of range information associated with the one or more targets.

In some implementations, the emitting step includes emitting each emission signal as a single laser pulse or a series of laser pulses, for example Gaussian laser pulses. Depending on the application, the at least one emission signal can consist either of a single emission signal or a plurality of emission signal, for example between 2 and 16 emission signals. In some implementations, the emitting step includes emitting the plurality of emission signals at a repetition frequency ranging from about 10 hertz to about 300 kilohertz. In some implementations, the emitting step includes emitting the at least one emission signal in a wavelength range of between about 380 nanometers (nm) and about 1550 nm.

In some implementations using a plurality of emission signals, the $n^{th}$ element of the main diagonal of the second-order signal matrix is expressed in terms of the sum of the squares of the $n^{th}$ samples of the plurality of digital signal waveforms.

In some implementations, the number N of samples in the at least one digital signal waveform can range from about 256 to about 2048 or even higher. For example, in some non-limiting implementations, N is equal to 512 or 1024. In some implementations, the converting step includes sampling the at least one return signal at an effective sampling frequency ranging from about 400 megasamples per second (MSPS) to about 2 gigasamples per second (GSPS).

In some implementations, the receiving step includes recording each return signal as a full-waveform lidar signal. In full waveform lidar, the receiver records the time-varying intensity of the return signal from each emission signal as waveform data, until a certain number of samples are recorded. All these samples can be digitized and stored as waveform data, which is available in its entirety for subsequent processing. Full waveform lidar therefore allows processing of the entire backscattered signal, rather than one sample at a time.

In some implementations, the creating step includes obtaining the second-order signal matrix as a matrix product of a first matrix of size N×K and a second matrix of size K×N, wherein each digital signal waveform is a column of the first matrix and a corresponding row of the second matrix, K being a positive integer equal to the number of the at least one digital signal waveform.

In some implementations, the creating step includes performing an echo decorrelation operation to attenuate or suppress off-diagonal content in the second-order signal matrix.

In some implementations, the creating step includes: forming an initial second-order matrix of size N×N from the at least one digital signal waveform, the initial second-order matrix having a main diagonal whose $n^{th}$ element is expressed in terms of the square of the $n^{th}$ sample of each digital signal waveform, where n is an integer ranging from 1 to N; and performing an echo decorrelation operation on the initial second-order matrix by reducing off-diagonal elements of the initial second-order matrix to obtain the second-order signal matrix.

In some implementations, forming the initial second-order matrix includes creating each secondary diagonal of the initial second-order matrix using either a subset of the elements on the main diagonal or one or more combinations of elements on the main diagonal (e.g., one or more interpolations between adjacent elements on the main diagonal). Furthermore, performing the echo decorrelation operation on the initial second-order matrix includes applying an amplitude modulation to the initial second-order matrix by multiplying each element by a modulation factor having a value that decreases as the distance between the element and the main diagonal increases. In some cases, the value of the modulation factor decreases on either side of the main diagonal according to a modulation function selected in accordance with a shape of the at least one emission signal.

In some implementations, the initial second-order matrix includes obtaining the initial second-order matrix as a matrix product of a first matrix of size N×K and a second matrix of size K×N, wherein each digital signal waveform is a column of the first matrix and a corresponding row of the second matrix, K being a positive integer equal to the number of the at least one digital signal waveform. Furthermore, performing the echo decorrelation operation on the initial second-order matrix includes obtaining the second-order signal matrix as a Hadamard product of the initial second-order matrix and a conditioning matrix G. In some cases, the conditioning matrix G is a band matrix of size N×N in which the element G(i,j) is equal to 1 if |i−j|≤B and 0 elsewhere, where i and j are integers ranging from 1 to N, and B is a bandwidth parameter of the band matrix. In other cases, the conditioning matrix G is given by the expression $G = \sum_{\tau=1}^{N} a(\tau_n) a^T(\tau_n)$, where the $a(\tau_n)$ is a model vector of size N×1 representing a model of an echo waveform having a time of arrival $\tau_n$ corresponding to the $n^{th}$ sampling time of the set of N sequential sampling times, and the superscript T denotes a transpose operator.

In some implementations, the deriving step includes: performing an eigendecomposition of the second-order signal matrix; generating a time-domain pseudo-spectrum based on the eigendecomposition; detecting one or more peaks in the time-domain pseudo-spectrum; and determining the time-of-flight information associated with the one or more echoes based on the detected one or more peaks.

In some implementations, generating the time-domain pseudo-spectrum includes: providing a model vector of N elements representing an echo waveform model having an adjustable time of arrival; generating a noise subspace projector from the eigendecomposition; and projecting the model vector onto the noise subspace projector while varying the time of arrival of the echo waveform model in a range defined from the set of N sequential sampling times.

In some implementations, performing the eigendecomposition of the second-order signal matrix includes generating a set of N eigenvalues and a corresponding set of N eigenvectors for the second-order signal matrix, and generating the noise subspace projector includes: identifying one or more eigenvalues among the N eigenvalues as one or more signal eigenvalues associated with the one or more echoes to be detected in the at least one return signal; determining a signal subspace from the eigenvectors corresponding to the signal eigenvalues; and obtaining the noise subspace projector as the orthogonal complement of the signal subspace. In some implementations, identifying the one or more signal eigenvalues includes selecting the one or more signal eigenvalues using a threshold-based criterion.

In accordance with another aspect, there is provided a non-transitory computer readable storage medium having stored thereon computer readable instructions that, when executed by a processor, cause the processor to perform the computer-implemented method as disclosed herein, including at least the steps of:

receiving, by a processor, at least one digital signal waveform digitized from at least one respective return signal received in response to at least one emission signal emitted onto the scene, each at a respective emission time, each return signal including one or more echoes to be detected produced by reflection of the respective at least one emission signal from the one or more targets, each digital signal waveform including a set of N real-valued samples representing the respective return signal at a set of N sequential sampling times elapsed after the emission time of the respective emission signal;

creating, by the processor, a second-order signal matrix of size N×N from the at least one digital signal waveform, the second-order signal matrix having a main diagonal whose $n^{th}$ element is expressed in terms of the square of the $n^{th}$ sample of each digital signal waveform, where n is an integer ranging from 1 to N; and deriving, by the processor, time-of-flight information associated with the one or more echoes based on the second-order signal matrix, the time-of-flight information being indicative of range information associated with the one or more targets.

In accordance with another aspect, there is provided a computer device for detecting and ranging one or more targets within a scene, the computer device including: a processor; and a non-transitory computer readable storage medium operably connected to the processor, the non-transitory computer readable storage medium having stored thereon computer readable instructions that, when executed by the processor, cause the processor to perform the computer-implemented method as disclosed herein.

In accordance with another aspect, there is provided a system for detecting and ranging one or more targets within a scene, the system including:

an emitter to emit an emission signal onto the scene at an emission time;

a receiver to receive a return signal in response to the emission signal, the return signal including one or more echoes to be detected produced by reflection of the emission signal from the one or more targets; and an analog-to-digital converter coupled to the receiver and configured to convert the return signal into a digital signal waveform, the digital signal waveform including a set of N real-valued samples representing the return signal at a set of N sequential sampling times elapsed after the emission time of the emission signal; and a processor coupled to the analog-to-digital converter and configured to:

create a second-order signal matrix of size N×N from the digital signal waveform, the second-order signal matrix having a main diagonal whose $n^{th}$ element is expressed in terms of the square of the $n^{th}$ sample of the digital signal waveform, where n is an integer ranging from 1 to N; and derive time-of-flight information associated with the one or more echoes based on the second-order signal matrix, the time-of-flight information being indicative of range information associated with the one or more targets.

In some implementations, the emitter is a pulsed laser source, for example configured to emit the emission signal as a single or a train of laser pulses, each having a Gaussian profile. In some cases, the emitter is configured to emit the emission signal in a wavelength range of between about 380 nm and about 1550 nm, and/or a repetition frequency ranging from about 100 hertz to about 300 kilohertz.

In some implementations, the system is a lidar system.

In some implementations, the analog-to-digital converter is configured to sample the return signal at an effective sampling frequency ranging from about 400 MSPS to about 2 GSPS.

In some implementations, the receiver is configured to record the return signal as a full-waveform lidar signal.

In some implementations, the processor is configured to create the second-order signal matrix as a matrix product of a first matrix of size N×K and a second matrix of size K×N, wherein the digital signal waveform is a column of the first matrix and a corresponding row of the second matrix, K being a positive integer equal to the number of the at least one digital signal waveform.

In some implementations, the processor is configured to create the second-order signal matrix by performing an echo decorrelation operation to attenuate or suppress off-diagonal content in the second-order signal matrix.

In some implementations, the processor is configured to create the second-order signal matrix by: forming an initial second-order matrix of size N×N from the digital signal waveform, the initial second-order matrix having a main diagonal whose $n^{th}$ element is expressed in terms of the square of the $n^{th}$ sample of the digital signal waveform, where n is an integer ranging from 1 to N; and performing an echo decorrelation operation on the initial second-order matrix by reducing off-diagonal elements of the initial second-order matrix to obtain the second-order signal matrix.

In some implementations, the processor is configured to form the initial second-order matrix by creating each secondary diagonal of the initial second-order matrix using either a subset of the elements on the main diagonal or one or more interpolations between adjacent elements on the main diagonal. The processor is also configured to perform the echo decorrelation operation on the initial second-order matrix by applying an amplitude modulation to the initial second-order matrix, the amplitude modulation including multiplying each element of the initial second-order matrix by a modulation factor having a value that decreases as the distance between the element and the main diagonal increases.

In some implementations, the processor is configured to form the initial second-order matrix as a matrix product of a first matrix of size N×K and a second matrix of size K×N, wherein the digital signal waveform is a column of the first matrix and a corresponding row of the second matrix, K being a positive integer equal to the number of the at least one digital signal waveform. The processor is also configured to perform the echo decorrelation operation on the initial second-order matrix by obtaining the second-order signal matrix as a Hadamard product of the initial second-order matrix and a conditioning matrix G. In some cases, the conditioning matrix G is given by the expression $G=\Sigma_{\tau=1}^{N} a(\tau_n)a^T(\tau_n)$, where the $a(\tau_n)$ is a model vector of size N×1 representing a model of an echo waveform having a time of arrival $\tau_n$ corresponding to the $n^{th}$ sampling time of the set of N sequential sampling times, and the superscript T denotes a transpose operator.

In some implementations, the processor is configured to derive the time-of-flight information by: performing an eigendecomposition of the second-order signal matrix; generating a time-domain pseudo-spectrum based on the eigendecomposition; detecting one or more peaks in the time-domain pseudo-spectrum; and determining the time-of-flight information associated with the one or more echoes based on the detected one or more peaks.

In some implementations, the present techniques provide a second-order detection method for TOF-based detection of signals having no phase information, that is, signals that are entirely real. In some implementations, the present techniques provide an adaptation of the MUltiple SIgnal Classification (MUSIC) method to lidar signal detection. In such a case, the method can be used to detect the position of echoes in full-waveform lidar data, in which the backscattered or reflected return signal of each emitted signal is recorded and digitized over a finite duration before being available in its entirety for processing. The MUSIC algorithm is conventionally used for estimating the direction of arrival (DOA) of one or multiple sources using an antenna array system. The conventional MUSIC algorithm uses steering vectors and operates on complex signals. However, the present techniques have found that these adaptations are not applicable to real-valued return signals for which no phase or carrier information is available.

In some implementations, the disclosed methods can include a step of defining delay vectors adapted to real-valued return signals with envelope amplitude information but no carrier phase information. The conventional formulation of the MUSIC algorithm in terms of steering vectors is adapted in the time-domain for use with delay vectors. In such implementations, each delay vector represents a model of an expected return signal measured as function of TOA delay over a finite acquisition period, rather than the model of the shape of a signal at a specific time as a function of direction of arrival. The result is a functional time-based MUSIC algorithm adapted to real signals containing no quadrature information.

In some implementations, the disclosed methods can also include a step of forming, from the received signals, a matrix analogous to the covariance matrix obtained in the conventional MUSIC algorithm, followed by a step of performing an eigendecomposition of this "covariance" matrix into its eigenvalues. Once the eigenvalues have been obtained, the number of echo sources can be determined, with the aim of separating the source eigensubspace from the noise eigensubspace. In general, different methods or criteria can be used for identifying source eigenvalues. Because of the nature of the signals and the resulting covariance-like matrix, the eigendecomposition produces entirely real eigenvalues and eigenvectors. Once the eigendecomposition has been completed, the disclosed methods can include a step of computing a pseudo-spectrum of the received signals. The pseudo-spectrum exhibits peaks at locations, corresponding to TOA delays, where echo sources are detected in the received return signals. Since the signals are defined from real quantities, the model used for plotting the pseudo-spectrum can also be converted into a real-value-based model including a time-based delay parameter. The range to each echo source can be determined using the TOF principle by converting TOA delays to distances.

In some implementations, the disclosed methods can include a step of performing an echo decorrelation preprocessing on the second-order signal matrix of the received signals. Correlated echoes, also referred to as duplicates, appear as unwanted off-diagonal content in the second-order signal matrix that result from the cross-product between echoes produced by different targets within the scene. This decorrelation preprocessing can allow better discrimination of targets with overlapping echoes and improved detection of low signal-to-noise-ratio (SNR) echoes. Since conventional spatial smoothing techniques as used in antenna processing have been found to be ill-adapted to processing TOA delays on amplitude-based signals, the present method provides other matrix decorrelation preprocessing approaches, including an anti-diagonal modulation scheme and a model-matrix modulation scheme. In some implementations, it has been found that decorrelation preprocessing can improve both the accuracy of the eigendecomposition of the second-order signal matrix and the identification of the number and locations of echo sources.

In some implementations, the present techniques method can achieve one or more of the following: enhanced discrimination of partially superimposed echoes, improved minimum SNR detection threshold, increased detection range, and reduced computation requirements.

It is noted that other method and process steps may be performed prior, during or after the above-described steps. The order of one or more of the steps may also differ, and some of the steps may be omitted, repeated and/or combined, depending on the application. It is also to be noted that some method steps can be performed using various image processing techniques, which can be implemented in hardware, software, firmware or any combination thereof.

Other features and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features can be combined with one another, unless stated otherwise.

BRIEF DESCRIPTION OF THE DRAWINGS

FIGS. 4A to 4D are four numerically calculated digital signal waveforms representing four return signals originating from a scene in response to four emission signals. The scene includes three targets to be detected. Each digital signal waveform is made up of 512 samples and contains three echoes representing the three targets within the scene.

In FIGS. 6A to 6C, the vertical axis represents the amplitude of the matrix elements over all rows and columns.

DETAILED DESCRIPTION

Figure 1:
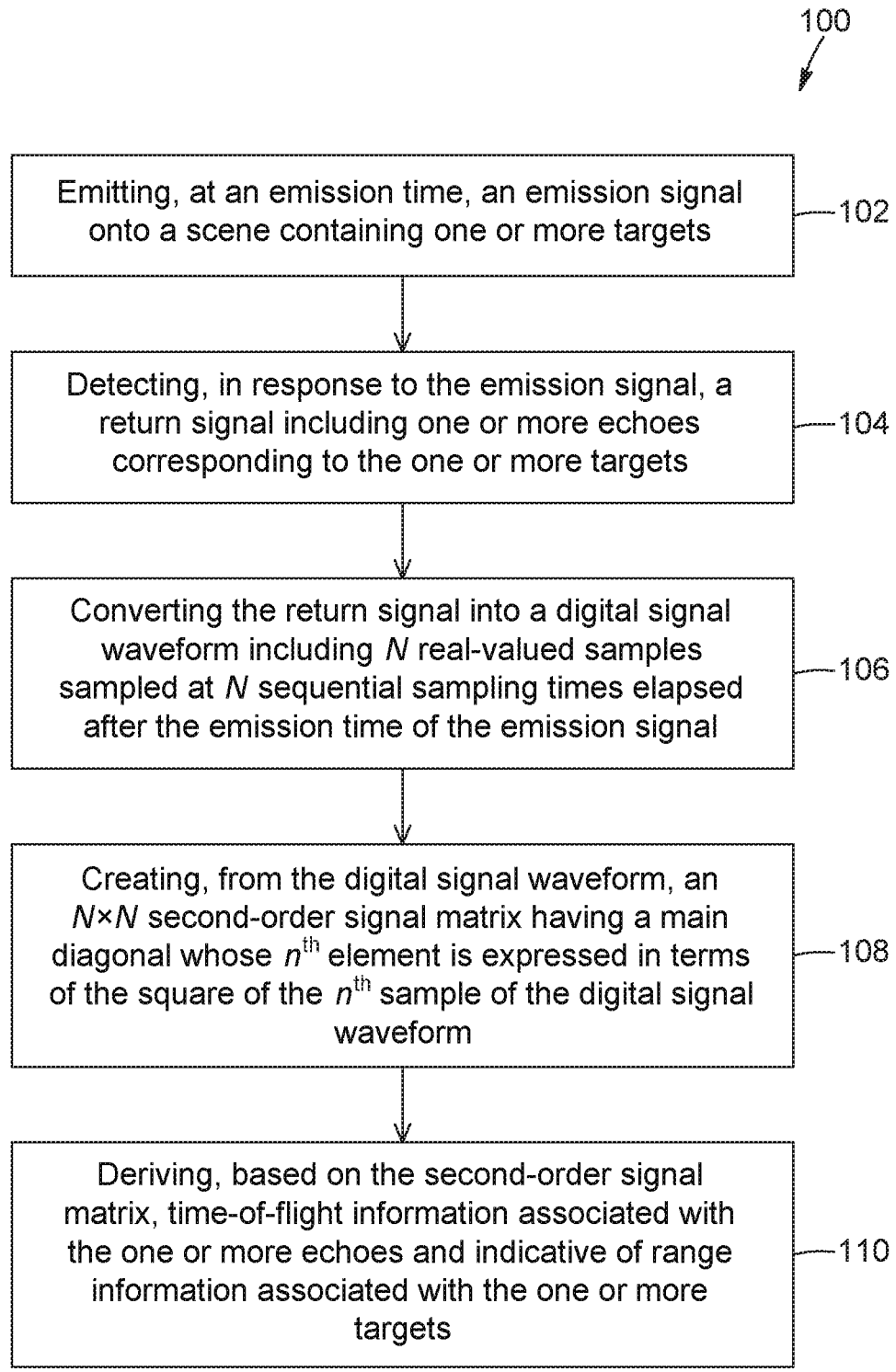
FIG. 1 is a flow diagram of a method for detecting and ranging one or more targets within a scene, in accordance with a possible embodiment.

In the present description, similar features in the drawings have been given similar reference numerals. To avoid cluttering certain figures, some elements may not be indicated, if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. More particularly, it will be understood that such spatially relative terms are intended to encompass different orientations in the use or operation of the present embodiments, in addition to the orientations exemplified in the figures.

Unless stated otherwise, the terms "connected" and "coupled", and derivatives and variants thereof, refer herein to any connection or coupling, either direct or indirect, between two or more elements. For example, the connection or coupling between the elements may be mechanical, optical, electrical, logical, or any combination thereof.

In the present description, the term "measured" when referring to a quantity or parameter is intended to mean that the quantity or parameter can be measured either directly or indirectly. In the case of indirect measurement, the quantity or parameter can be derived, retrieved, inferred or otherwise determined from directly measured data.

The terms "a", "an" and "one" are defined herein to mean "at least one", that is, these terms do not exclude a plural number of items, unless stated otherwise.

Terms such as "substantially", "generally" and "about", that modify a value, condition or characteristic of a feature of an exemplary embodiment, should be understood to mean that the value, condition or characteristic is defined within tolerances that are acceptable for the proper operation of this exemplary embodiment for its intended application. Likewise, the term "match" is intended to refer herein to a condition in which two elements are either the same or within some predetermined tolerance of each other.

In the present description, the terms "light" and "optical", and any variants and derivatives thereof, are intended to refer to electromagnetic radiation in any appropriate region of the electromagnetic spectrum. These terms are not limited to visible light, but can also include invisible regions of the electromagnetic spectrum including, without limitation, the infrared (IR) and ultraviolet (UV) spectral bands. For example, in some embodiments, the present techniques can be implemented with light having a wavelength band lying somewhere in a range from about 380 nm to about 1550 nm. However, this range is provided for illustrative purposes only and the present techniques may operate beyond this range. It should be noted that the present techniques are not restricted to electromagnetic signals, but can be implemented with other types of signals including, but not limited to, acoustic and electrical signals.

In the present description, the term "target" is meant to encompass any object, person, animal, building, structure, feature or information of interest, whether natural or human-made, which can be detected and ranged according to the present techniques.

The present description discloses detection and ranging techniques, such as, for example, lidar remote sensing. In accordance with various non-limiting aspects, the present description relates to a method, a computer-implemented method and a system for detecting and ranging one or more targets within a scene; a non-transitory computer readable storage medium having stored thereon computer readable instructions that, when executed by a processor, cause the processor to perform the disclosed methods; and a computer device including a processor and such a non-transitory computer readable storage medium.

In some implementations, the present techniques provide a second-order TOF-based detection and ranging method adapted for real-valued, full-waveform lidar data and established using principles inspired, at least in part, from conventional DOA estimation methods based on second-order statistics and using complex-valued signals, such as MUSIC.

The present techniques can be used or implemented in various TOF-based remote sensing applications that require or can benefit from enhanced target detection capabilities, notably in the presence of noisy signals and/or overlapping echoes. The present techniques can be implemented in a variety of optical detection and ranging systems including, but not limited to, airborne, spaceborne, and terrestrial lidar systems. Non-limiting fields of application include autonomous and semi-autonomous vehicle operation and monitoring applications for obstacle detection (e.g., pedestrians, buildings, other vehicles), lane markings detection, sign or signal detection, traffic monitoring and the like; high-resolution mapping (e.g., topography, bathymetry, geography, forestry, swath mapping, digital elevation model acquisition); security and control applications; and the like.

Referring to FIG. 1, there is provided a flow diagram of an embodiment of a method 100 for detecting and ranging one or more targets within a scene. Broadly stated, and as described in greater detail below, the method 100 of FIG. 1 includes a step 102 emitting, from an emitter, at least one emission signal onto the scene, each emission signal having a respective emission time, and a step 104 of receiving, by a receiver, at least one return signal in response to the at least one emission signal. Each return signal includes one or more echoes to be detected produced by reflection of the respective emission signal from the one or more targets. The method 100 also includes a step 106 of converting, by an analog-to-digital converter, the at least one return signal into at least one respective digital signal waveform. Each digital signal waveform includes a set of N real-valued samples representing the respective return signal at a same set of N sequential sampling times elapsed after the emission time of the respective emission signal. The method further includes a step 108 of creating, by a processor, a second-order signal matrix of size N×N from the at least one digital signal waveform. The second-order signal matrix has a main diagonal of N elements, in which the $n^{th}$ element is expressed in terms of the square of the $n^{th}$ sample of each digital signal waveform, where n is an integer ranging from 1 to N. The creating step 108 is followed by a step 110 of deriving, by the processor, time-of-flight information associated with the one or more echoes based on the second-order signal matrix. The derived time-of-flight information conveys range information associated with the one or more targets.

These and other possible method steps and variants according to the present techniques will be described in greater detail below.

Figure 2:
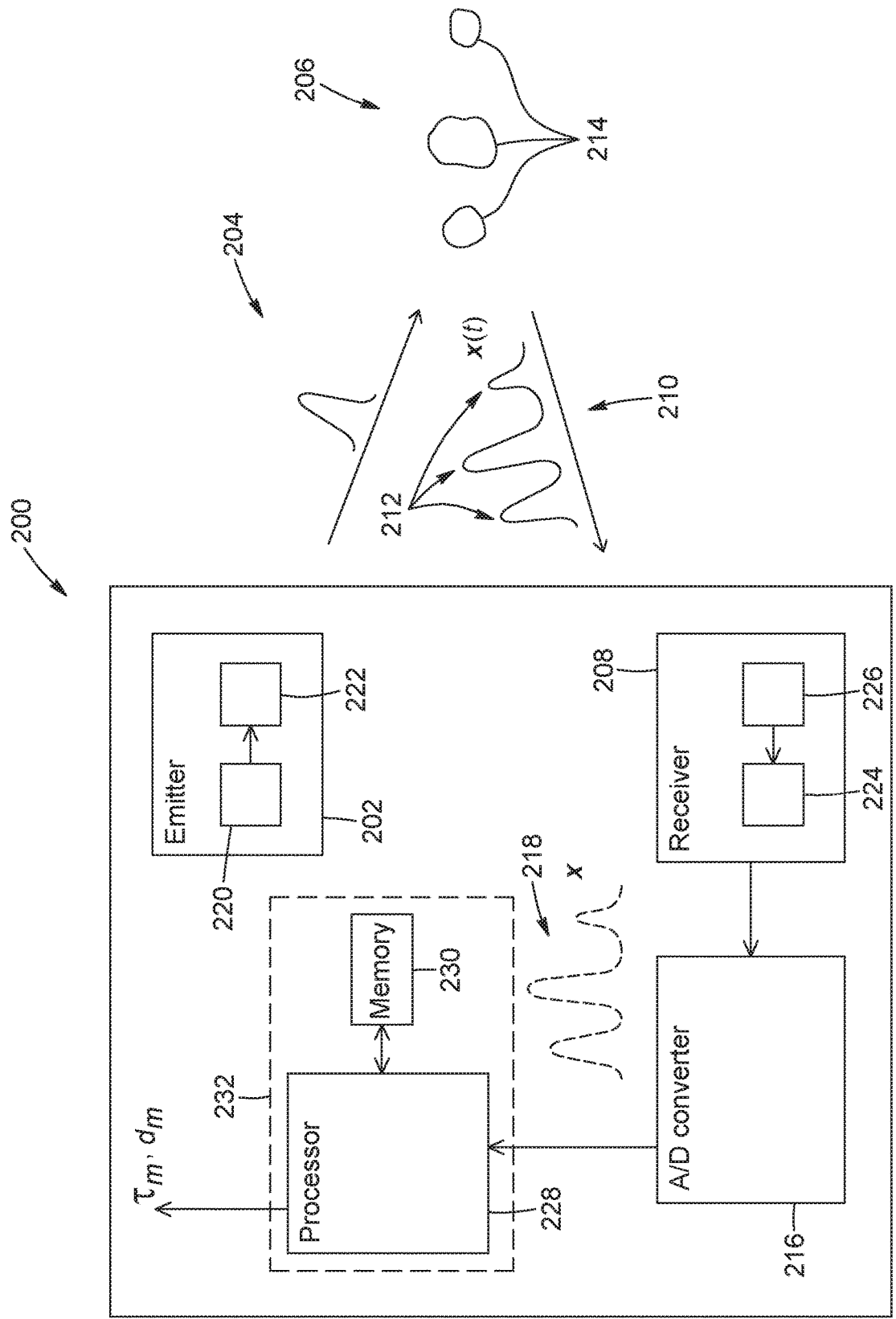
FIG. 2 is a schematic representation of a system for detecting and ranging one or more targets within a scene, in accordance with a possible embodiment.

The method 100 of FIG. 1 can be implemented in a detection and ranging system 200 such as the one illustrated in FIG. 2, in another system. For example, the detection and ranging system 200 can be embodied by a lidar detection system. However, in other embodiments, the system 200 according to the present techniques need not be a lidar system. Other non-limiting examples of possible ranging systems include radar or sonar systems, or any other suitable systems that can detect the envelope amplitude of received return signals.

The system 200 of FIG. 2 generally includes an emitter 202 configured to emit an emission signal 204 onto a scene 206 at an emission time $t_0$, and a receiver 208 configured to receive and record a return signal 210, or snapshot, in response to the emission signal 204. The emission signal 204 may be formed of a single emission pulse or a train of emission pulses. The emission time $t_0$ can be defined with respect to the peak or another characteristic of the emission signal 204. The return signal 210 includes one or more echoes 212 produced by reflection of the emission signal 204 from one or more targets 214 within the scene 206. It should be noted that when the emission signal 204 is made of a train of pulses, the return signal 210 may represent an accumulated return of the train of pulses. In FIG. 2, the scene 206 includes three targets 214 for illustrative purposes, but this number can vary in other embodiments. The system 200 also includes an analog-to-digital converter 216 coupled to the receiver 208 and configured to convert the return signal 210 into a digital signal waveform 218. The digital signal waveform 218 includes a set of N real-valued samples representing the return signal 210 at a set of N sequential sampling times elapsed after the emission time $t_0$ of the emission signal 204. More detail regarding the structure, configuration and operation of these and other possible components and features of the system according to the present techniques will be described in greater detail below.

Referring still to FIG. 2, the emitter 202 can include a light source assembly 220 to generate the emission signal 204 and emitter optics 222 to shape or condition the emission signal 204 generated by the light source assembly 220. The emitter optics 222 can include one or more optical components configured to direct, collimate, focus, scan, shape or otherwise condition the emission signal 204 prior to the emission signal 204 leaving the emitter 202 and being projected onto the scene 206.

The light source assembly 220 can be embodied by any appropriate device or combination of devices capable of generating an emission signal suitable for detecting and ranging according to the present techniques. Non-limiting examples of possible light sources include laser diodes, fiber lasers, solid-state lasers, dye lasers, gas lasers, and non-laser sources such as light-emitting diodes and lamps. For lidar applications, the light source is typically a pulsed laser source, for example a pulsed laser diode or a pulsed fiber laser. Alternatively, the emission signal 204 may be generated by a continuous-wave light source whose output is coupled to an external waveform modulator. The choice of light source for a certain application can be made based on various factors including, without limitation, spatial and spectral profiles, beam quality and divergence, degree of coherence, irradiance, compactness, reliability, and, for pulsed sources, pulse characteristics such as peak power, repetition frequency or rate, duration, shape, center wavelength, and the like. In some implementations, the emitter 202 can be configured to emit the emission signal 204 in a wavelength range of between about 380 nm and about 1550 nm, although values outside this range are possible in other implementations. The emission signal 204 emitted by the emitter 202 generally has a known pulse shape, for example a Gaussian pulse shape of the form $f(t) \propto \exp[-(t-t_{0k})^2/2\sigma^2]$ or another suitable pulse shape, where $t_{0k}$ is the emission time of the $k^{th}$ emission signal.

The receiver 208 can include a detector assembly 224 to detect the return signal 210 and receiver optics 226, for example lens, mirrors or filters, to collect, redirect or otherwise act on the return signal 210 before it reaches the detector assembly 224. The detector assembly 224 generally operates as an opto-electrical converter configured to sense the return signal 210 originating from the one or more targets 214 and convert it into an electrical signal representative of the sensed return signal 210. The detector assembly 224 can include a photodetector capable of sensing the return signal 210 resulting from the interaction of the emission signal 204 with the one or more targets 214. Depending on the application, a variety of photodetectors can be used including, but not limited to, PIN and avalanche photodiode detectors, photomultiplier tubes, charge-coupled devices (CCD) sensors, complementary metal-oxide-semiconductor (CMOS) sensors, and charge injection devices.

In some implementations, the detected return signal 210 produced in response to the emission signal can be written as:

$$x(t) = \sum_{m=1}^{M} \alpha_m s(t-\tau_m) + n(t), \quad (1)$$

where M is the number of the one or more targets within the scene; $s(t-\tau_m)$ is the $m^{th}$ echo produced by the $m^{th}$ target within the scene, which for a Gaussian emission signal can be written as $\exp[-(t-\tau_m)^2/2\sigma^2]$; $\tau_m$ is the time delay of the $m^{th}$ echo, which can be measured from the emission time $t_0$ of the corresponding emission signal; and n(t) is the noise component of the return signal. Based on the TOF principle, the range $r_m$ to the $m^{th}$ target can be obtained from the time of delay $\tau_m$ of the $m^{th}$ echo using the relationship $r_m = \frac{1}{2}(v_{light} \times \tau_m)$, where $v_{light}$ is the speed of light in the propagation medium (e.g., air) and the ½ factor accounts for the fact that $\tau_m$ represents the round-trip time of flight to and back from the $m^{th}$ target. It should be noted that the number and location in time of echoes in the return signal are generally unknown a priori and may be challenging to determine from the return signal alone, especially in the presence of non-negligible noise and/or closely spaced or overlapping echoes.

In the embodiment of FIG. 2, the analog-to-digital converter 216 is coupled to the receiver 208 and receives therefrom the analog electrical signal representing the return signal 210. Depending on the application, the electrical signal may be amplified prior to digitization, for example by passing it through a suitable amplification circuit. In the present description, the term "analog-to-digital converter" broadly refers to any device or combination of devices that convert an analog signal to a digital signal, for example by sensing and sampling the analog signal. The digital signal may be outputted in any suitable format including binary code, binary coded decimal output, and any other types of digital codes.

The analog-to-digital converter 216 is configured to sample and digitize the analog electrical signal at an effective sampling frequency $f_s$ to produce the digital signal waveform 218 made up of N samples indicative of the return signal 210 at N corresponding sampling times elapsed after the emission time $t_0$ of the emission signal 204. In some implementations, the number of samples, N, can range from about 256 to about 2048, although values outside this range may be used. For example, in some non-limiting applications, N can be equal to 512 or 1024. The number of samples N forming the digital signal waveform is generally specified depending on a specified operating range $r_{max}$ of the system 200, as $r_{max} = \frac{1}{2}(v_{light} \times NT_s)$, where $T_s = 1/f_s$ is the duration of one sampling period, so that for a given value of $T_s$, the greater the number of samples recorded at each emission signal, the longer the operating range of the system 200. In some implementations, the effective sampling frequency $f_s$ can range from about 400 MSPS to about 2 GSPS, although values outside this range are possible in other implementations.

Depending on the application, the analog-to-digital converter 216 can implement various conversion and sampling schemes including, but not limited to, direct sampling, integrating sampling, time-equivalent sampling, and time-interleaved sampling, hence the term "effective" sampling frequency. In some implements, the sampling technique to be used can be determined by considering the relationship between the desirable or required sampling rate and the bandwidth of the signal. It should be noted that various types of analog-to-digital converters exist that can be used to implement the present techniques, which can be based on integrated circuits or other types of electronic, partially electronic and non-electronic components. In this regard, since the structure, configuration and operating principles of analog-to-digital converters are generally well known to one skilled in the art, they need not be described in greater detail herein.

In some implementations, the system 200 can be a full-waveform lidar system in which the receiver 208 is able to record the entire time-varying intensity of the return signal 210 produced in response to the emission signal 204 over a period of time. Full-waveform lidar can therefore process the received return signal 210 as one continuous waveform, rather than one sample at a time, which can allow for multi-target range information. In full-waveform lidar, the digital signal waveform 218 can be expressed as an N×1 column vector x as follows:

$$x = \begin{bmatrix} x(T_s) \\ x(2T_s) \\ \vdots \\ x(nT_s) \\ \vdots \\ x(NT_s) \end{bmatrix}, \quad (2)$$

where the $n^{th}$ element of x is given by $x(nT_s)$, the $n^{th}$ time sample acquired from the return signal $x(t)$ of Equation (1). It should be noted that while the digital signal waveform x is represented as a column vector in Equation (2), it could alternatively be represented as a row vector. In such a case, several of the equations presented below would have to be adapted by applying appropriate transpose operations.

The digital signal waveform x may be also expressed in terms of a signal component, made up of one or more signal vectors $s(\tau_m)$ associated with the one or more echoes 212 originating from the one or more targets 214 within the scene 206, and a noise component n, as follows:

$$x = \sum_{m=1}^{M} \alpha_m s(\tau_m) + n, \quad (3)$$

where both $s(\tau_m)$ and n are N×1 vectors. As mentioned above, the number and location in time of echoes in the return signal are generally unknown a priori and are to be determined.

In most lidar applications, the carrier frequency $f_0$ of the emission signal 204 is much larger than the effective sampling frequency $f_s$. For example, in some implementations, the carrier frequency $f_0$ of the emission signal can range between about 380 nm and 1550 nm, while the effective sampling frequency $f_s$ can range between about 400 MSPS and about 2 GSPS. As a result, the digital signal waveform 218 obtained after sampling and digitization of the return signal 210 is a real-valued discrete function in the time-domain that is representative of the square of the envelope amplitude of the return signal 210 but contains no phase information. This means that all of the elements of x in Equation (2) are strictly real quantities, that is, $x \in \mathbb{R}^{N \times 1}$.

In some implementations, the present techniques can be implemented using a single digital waveform signal obtained by sampling and digitization of a single return signal received in response to a single emission signal emitted toward the scene. However, in other implementations, the emitter 202 is configured to emit a series of K emission signals 204 toward the scene 206, thereby producing a corresponding series of K return signals 210. In some implementations, the number of emission signals 204 can range between two and sixteen, although values outside this range can be used in other implementations.

Figure 3:
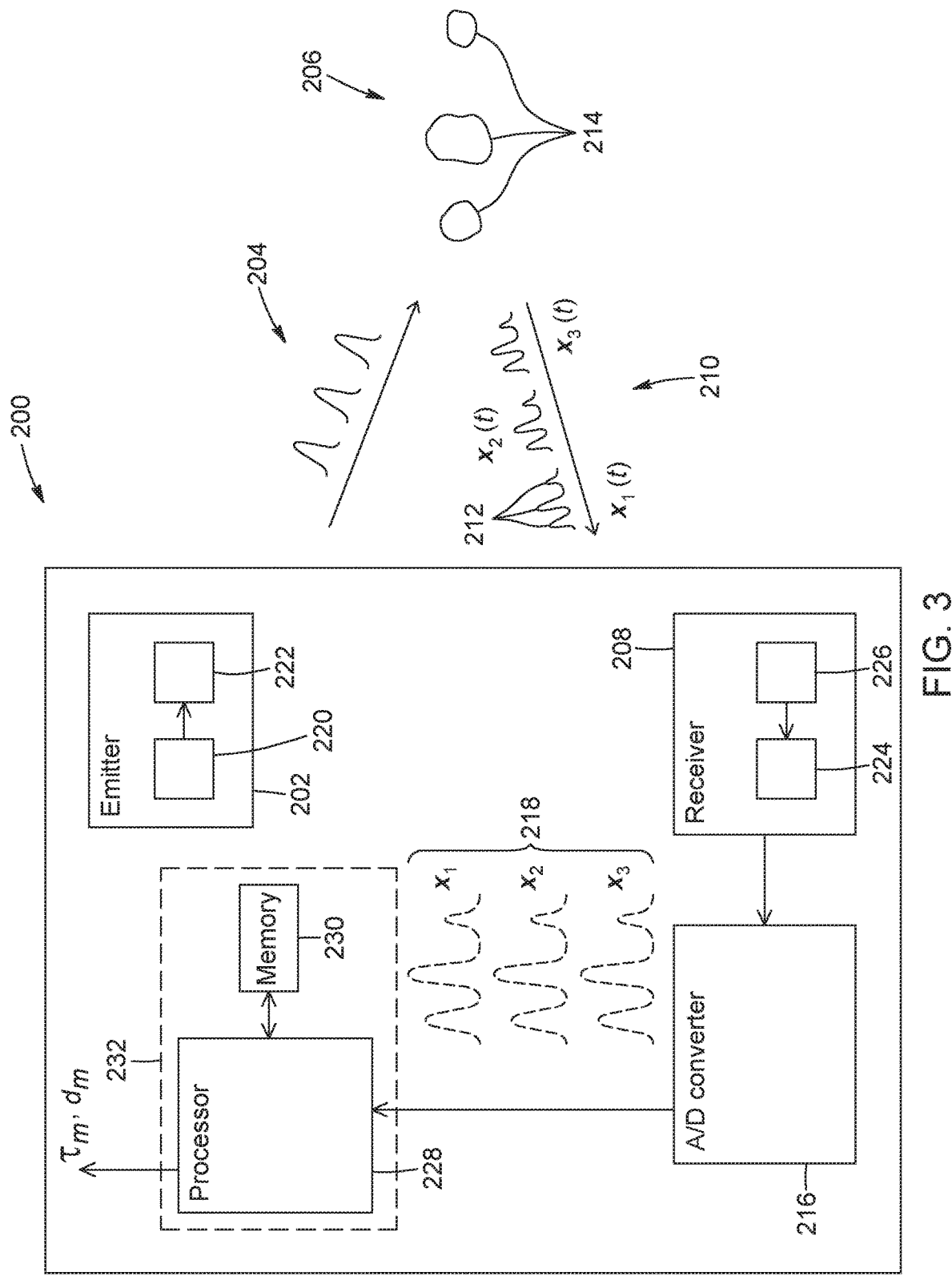
FIG. 3 is a schematic representation of a system for detecting and ranging one or more targets within a scene, in accordance with another possible embodiment.

Referring to FIG. 3, there is shown another embodiment of a detection and ranging system 200. This embodiment is similar to the one of FIG. 2, but differs in that it implements a multi-signal configuration in which the emitter 202 is configured to emit K emission signals 204 toward the scene 206 and the receiver 208 is configured to collect and detect K return signals 210 in response to the K emission signals 204. For illustrative purposes, K=3 in the embodiment of FIG. 3. The $k^{th}$ return signal 210 is received by the receiver 208 and converted into a $k^{th}$ digital signal waveform $x_k$, $k \in \{1, 2, \ldots, K\}$. If the emitter 202 emits the K emission signals at a sufficiently high repetition frequency, for example ranging from about 10 hertz to about 300 kilohertz, it can be assumed that the scene 206 remains stationary, or substantially stationary during the time of recording the K return signals in response to the K emission signals. Therefore, apart from noise, the K return signals are expected to be identical, notably in terms of the number and location of echoes 212. The term "substantially stationary", when referring to an observable scene, is intended to refer to a scene that does not change significantly over a specified time interval, generally corresponding to the time of data collection (e.g., the recording of K return signals in response to K emission signals). The term "substantially stationary" should therefore be understood to mean that the scene, and particularly the one or more targets therewithin, remains unchanged or immobile to a degree or within tolerances that are acceptable for the proper operation of a certain application. In some implementations, it may be envisioned to compensate, at least partly, for variations in the scene during an experiment.

In such implementations, the set of K digital signal waveforms $x_k$ can be stored and processed as a waveform array or history matrix X of size N×K, which can be expressed as:

$$X = [x_1 x_2 \ldots x_k \ldots x_K], \quad (4)$$

where the $k^{th}$ column of X is made up of the digital signal waveform $x_k$ associated with the $k^{th}$ return signal $x_k(t)$ produced in response to the $k^{th}$ emission signal. The $k^{th}$ return signal $x_k(t)$ can be expressed similarly as in Equation (1) and the $k^{th}$ digital signal waveform $x_k$ can be expressed similarly as in Equations (2) and (3), that is, $$x_k(t) = \sum_{m=1}^{M} \alpha_{m,k} s_k(t - \tau_m) + n_k(t), \quad (5)$$

$$x_k = \begin{bmatrix} x_k(T_s) \\ x_k(2T_s) \\ \vdots \\ x_k(nT_s) \\ \vdots \\ x_k(NT_s) \end{bmatrix}, \quad (6)$$

$$x_k = \sum_{m=1}^{M} \alpha_{m,k} s_k(\tau_m) + n_k. \quad (7)$$

It is to be noted that in implementations where a single emission signal is used, the history matrix X reduces to an N×1 digital signal waveform x given, for example, by Equation (2). To facilitate processing of the history matrix X, each digital signal waveform $x_k$ can be expressed in terms of a same set of N sampling times elapsed relative to the emission time $t_{0k}$ of $k^{th}$ emission signal. This can ensure that the K digital signal waveforms are all aligned in time, so that echo locations are expected to be the same across all the digital signal waveforms.

Referring to FIGS. 4A to 4D, an example of a history matrix X including four digital signal waveform responses $x_1$, $x_2$, $x_3$ and $x_4$, (K=4) and three echoes 212 (M=3) is provided. As can be seen, each one of the three echoes 212 has the same time of arrival ($\tau_1$=19, $\tau_2$=118 and $\tau_3$=336) in every response, but the noise is different. Each response $x_k$ recorded by the system consists of 512 samples (N=512), but this number is adjustable and can differ from one system to another. The TOA delay $\tau_m$ of the $m^{th}$ echo of the $k^{th}$ response relative to the emission time $t_{0k}$ of the $k^{th}$ emission signal is given by $\tau_m = \Delta n T_s$, where $\Delta n$ is the number of samples acquired between the emission time $t_{0k}$ of the $k^{th}$ emission signal and the detection of the $m^{th}$ echo. As mentioned above, the TOA delay of any of the M echoes 212 is expected to be the same in all of the K responses under the assumption of a stationary or nearly stationary scene.

Returning to FIGS. 2 and 3, the system 200 further includes a processor 228 coupled to the analog-to-digital converter 216 and receiving therefrom the history matrix X including one (FIG. 2) or multiple (FIG. 3) digital signal waveforms $x_k$.

In the present description, the term "processor" refers to an entity that controls and executes, at least in part, the operation of the system 200. The processor 228 can be provided within one or more general purpose computers and/or within any other dedicated computing devices. For example, the processor 228 may include or be part of one or more of a computer, a microprocessor, a microcontroller, a central processing unit (CPU), a programmable logic device such as, for example, a field-programmable gate array (FPGA), a digital processor, an analog processor, a digital circuit designed to process information, an analog circuit designed to process information, a state machine, and/or other mechanisms for electronically processing information.

It should be noted that although the processor 228 is shown in FIGS. 2 and 3 as a single entity, this is for illustrative purposes only, and the term "processor" should not be construed as being limited to a single processor. As such, in some implementations, the processor 228 may include a plurality of processing units. These processing units may be physically located within the same device, or the processor 228 may represent processing functionality of a plurality of devices operating in coordination. The processor 228 can be implemented in hardware, software, firmware, or any combination thereof, and be connected to various components of the system 200 via appropriate wired and/or wireless communication links and ports. It should also be noted that, in some implementations, the processor 228 and the analog-to-digital converter 216 may be part of a same central processing unit or computing device 232, while in other implementations, as in FIGS. 2 and 3, the analog-to-digital converter 216 may be separate from a central processing unit or computing device 232 containing the processor 228.

Referring still to FIGS. 2 and 3, the processor 228 may include or be coupled to one or more memory elements 230 capable of storing computer programs and other data to be retrieved by the processor 228. Each memory element 230 can also be referred to as a "computer readable storage medium". Depending on the application, the processor 228 may be integrated, partially integrated or physically separate from the optical hardware of the system 200, including, but not limited to, the emitter 202 and the receiver 208. In some implementations, the processor 228 and the one or more elements 230 can be part of a computer device 232.

The processor 228 is configured to create a second-order signal matrix $\hat{Z}$ of size N×N from the history matrix X. As described in greater detail below, the second-order signal matrix has a main diagonal whose $n^{th}$ element is expressed in terms of the square of the $n^{th}$ sample of the or each digital signal waveform $x_k$, n is an integer ranging from 1 to N. For illustrative purposes, this means that if the history matrix X contains three N×1 digital signal waveforms ($x_1$, $x_2$, $x_3$), then the $n^{th}$ element on the main diagonal of $\hat{Z}$ would be expressed in terms of $x_1^2(n)$, $x_2^2(n)$ and $x_3^2(n)$. The processor 228 is also configured to derive time-of-flight information associated with the one or more echoes based on the second-order signal matrix $\hat{Z}$, the time-of-flight information being indicative of range information associated with the one or more targets. More detail about the operation of the processor 228 to create $\hat{Z}$ and derive time-of-flight information therefrom will be provided below.

As mentioned above, some features of the present techniques are inspired, at least in part, from conventional DOA estimation methods based on second-order statistics and using complex-valued signals, such as MUSIC. Among these features are the creation of the second-order signal matrix $\hat{Z}$ from the at least one digital signal waveform $x_k$ and the derivation of time-of-flight information from the second-order signal matrix $\hat{Z}$. Before detailing how these two features are implemented according to the present techniques, an overview of some relevant aspects of the MUSIC method are provided below, from the perspective of adapting it to ranging applications based on real-valued return signals in the time domain.

The MUSIC method uses a correlation process and orthogonal subspace projection to estimate the directions of arrival of M sources with an array of N spaced-apart antennas. Each one of the N antennas acts as a receiver. During each sampling period $T_s$, data is acquired by each receiver. Thus, the vector of received signals x, or snapshots, is of dimension N×1, where N is the number of receivers in the array. The received signals can be expressed as:

$$x(kT_s) = \sum_{m=1}^{M} \alpha_m s(\phi_m, kT_s) + n(kT_s), \quad (8)$$

where n is the noise vector and s is the signal vector, both of size N×1; parameter $\phi_m$, which is the parameter to be determined, corresponds to the angle of arrival of the M incoming return signals from the M sources; variable $\alpha_m$ is the amplitude attributed to the $m^{th}$ source; and index k corresponds to the $k^{th}$ receiver sampling sequence, that is, the $k^{th}$ return response. During each sampling period $T_s$, all N antennas are sampled simultaneously. After a certain number K of received signals, or snapshots, has been recorded following observation of the scene seen by the antenna array, a history matrix X of size N×K made up of K received signals can be formed and processed. The history matrix X can be written as:

$$X = [x_1 x_2 \ldots x_K], \quad (9)$$

where the N×1 column vectors $x_k$ are the digitized received signals and can be written as:

$$x_k = \sum_{m=1}^{M} \alpha_{m,k} s_k(\phi_m) + n_k. \quad (10)$$

Since the product $a^H(\phi)s(\phi_m)$ is maximal when $\phi=\phi_m$, it is possible to know the level of correlation for each angle of arrival using the relationship:

$$P_{corr}(\phi)=a^H(\phi)x, \quad (11)$$

where $a(\phi)$ is a perfect or expected model of a signal received at an angle $\phi$ and the superscript H denotes a complex conjugate transpose, or Hermitian operator. As mentioned above, the present techniques are adapted for signals with no phase information and for determining the round-trip time delay—or time of flight —, rather than the direction of arrival. To adapt the correlation technique to TOA delays, the level of correlation for each round-trip time delay may be expressed as:

$$P_{corr}(\tau)=a^T(\tau)x_k, \quad (12)$$

where the transpose operator, denoted by the superscript T, rather than the Hermitian operator H, is used, since the system signals for the TOA delays are entirely real. Delay vectors $a(\tau)$ are constructed from an ideal or expected model of a return signal from a source, and according to a round-trip time delay r corresponding to the number of sampling periods $T_s$ separating the return echo (e.g., its peak) from the emission time $t_0$ of the emission signal. A maximum in the level of correlation will be reached when $\tau=\tau_k$, the time delay of source k. Vector $a(\tau)$ may contain a model return signal, such as a single echo at infinite SNR, with a TOA delay of $\tau$ samples.

Second-order statistical methods, such as MUSIC and the maximum likelihood (MLH) method, can be used with antenna arrays for DOA estimation. Such methods use second-order statistical signal properties, such as correlation or variance. While second-order methods tend to be computationally costlier than their first-order counterparts, they generally provide better performance in terms of resolution and SNR detection threshold, which make them advantageous for use in determining TOA delays. However, conventional second-order statistical methods are not adapted for use with real time-based signals.

In a first step, MUSIC involves forming a covariance matrix $R_{XX}$ from the N×K history matrix X of input data. The covariance matrix $R_{XX}$ can be defined as:

$$R_{XX}=E[XX^H], \quad (13)$$

where E[ ] denotes the expectation value operator of a random variable which, in Equation (13) is the N×N matrix $XX^H$. From the definition of received signals $x(kT_S)$ given in Equation (8), the covariance matrix can also be expressed as follows:

$$R_{XX}=AR_{SS}A^H+\sigma^2 I, \quad (14)$$

where $R_{SS}=E[SS^H]$ is the M×M covariance matrix of the complex envelopes of the signals $S=[s_1(\phi) \ldots s_M(\phi)]^T$ originating from the M sources, sometimes referred to as the signal correlation matrix, where S is of size M×K; $\sigma^2$ is the noise variance; I is an identity matrix of size N×N; and $A=[a(\phi_1) \ldots a(\phi_M)]$ is the N×M array steering matrix of M steering vectors $a(\phi_m)$ of size N×1. If used to represent the covariance matrix, the array steering matrix A contains only the steering vectors of the sources present in the signal. Given that these second-order methods can be used for antenna spatial processing, vectors $a(\phi_m)$ become steering vectors, especially when plotting spectra and pseudospectra, since they represent the model of the signals received at the receiver array as a function of direction of arrival.

It is generally not possible to obtain the covariance matrix $R_{XX}$ as defined in terms of the expectation value operator. This is because the number of tests to be recorded would in principle be infinite. In practice, the system is limited by the memory available and the fact that the scene should appear stationary to the measuring system. The time required to record a significant number of received signals is generally incompatible with the stationary scene approximation. In such cases, the following approximation of the covariance matrix can be used:

$$\hat{R}_{XX}=\frac{1}{K}\sum_{k=1}^{K}x_k x_k^H = \frac{1}{K}XX^H. \quad (15)$$

The formulation of the covariance matrix in the conventional MUSIC method will now be considered. As mentioned above, MUSIC can be used for determining directions of arrival ($\phi$). The MUSIC method is widely used due largely to its high resolution. For processing antenna signals, high performance can be obtained for both the resolution of the angle of arrival and the distinction between two sources with close angles of arrival. MUSIC was initially developed for antenna array implementations. In such cases, the algorithm uses a history matrix $X=[x_1 \, x_2 \, \ldots \, x_K]$ of received signals originating from a stationary scene, which can be used to form an approximated covariance matrix $\hat{R}_{XX}$, for example using Equation (15).

In the formulation of $R_{XX}$ of Equation (14), MUSIC assumes that M<N, and therefore that the number M of incoming received signals is less than the number N of receivers. As such, the matrix $AR_{SS}A^H$, which is of size N×N like $R_{XX}$, has a rank equal to M. Consequently, the dimension of the null space of $AR_{SS}A^H$ is N−M. The columns of A are orthogonal to this null space. As described in greater detail below, these properties can be useful in determining the number of incoming sources. Matrix $\hat{R}_{NN}$ approximates noise covariance, theoretically represented by $\sigma^2 I$.

After forming the covariance matrix based on K received signals recorded in the history matrix X, the next step in MUSIC is to perform an eigendecomposition of the covariance matrix into its eigenvalues, for example by expressing $\hat{R}_{XX}$ as a summation of eigenvectors weighted by associated eigenvalues:

$$\hat{R}_{XX}=\sum_{n=1}^{N}\lambda_n v_n v_n^H. \quad (16)$$

The N eigenvalues $\lambda_n$ can be stored in descending order on the main diagonal of the eigenvalue matrix $\Lambda$. All the other elements of $\Lambda$ are equal to zero. For each eigenvalue $\lambda_n$, an associated eigenvector $v_n$ can be obtained. The eigenvectors can be stored in the columns of an eigenvector matrix $V=[v_1 \ldots v_N]$ of size N×N. The eigenvectors are classified in the matrix in the same order as the eigenvalues. In other words, the eigenvector $v_1$ associated with the lowest-order eigenvalue $\lambda_1$ occupies the first column of matrix V, while the eigenvector associated with the highest-order eigenvalue $\lambda_N$ occupies the last column of V.

As mentioned above, the $\hat{R}_{XX}$ matrix is formed by a null space of dimension N−M. Therefore, the N eigenvalues of $\hat{R}_{XX}$ will include M eigenvalues of larger magnitude and N−M eigenvalues of smaller magnitude, theoretically equal to the noise variance $\sigma^2$ and tending toward zero. The M eigenvectors associated with the larger eigenvalues are those containing the return signals from the M sources. Separating the larger eigenvalues, associated with the source returns, from the smaller eigenvalues, associated with the noise, yields two eigensubspaces. The first eigensubspace is denoted as $E_s$ and formed of the M eigenvectors associated with the M larger eigenvalues. The matrix $E_s$ is of size N×M and referred to as the signal subspace. The second eigensubspace is denoted as $E_n$ and formed of the remaining N−M eigenvectors associated with the N−M smaller eigenvalues whose values tend to $\sigma_2$. The matrix $E_n$ is of size N×(N−M) and referred to as the noise subspace.

The next step of the MUSIC method is the derivation of a pseudo-spectrum. The pseudo-spectrum $P_{MUSIC}(\phi)$ will include M peaks indicating the directions of arrival of M incoming sources in the receiver array for processing antenna signals. The pseudo-spectrum can be computed by projecting a model steering vector $a(\phi)$ of a signal incident along direction $\phi$ onto the noise subspace $E_n$ while varying $\phi$, thus yielding:

$$P_{MUSIC}(\phi) = \frac{1}{a^H(\phi)E_n E_n^H a(\phi)}. \quad (17)$$

It is to be noted that the model steering vectors $a(\phi)$ are orthogonal to the noise subspace $E_n$ when the angle $\phi$ of the model vector a matches a direction of arrival $\phi_m$ of one of the M sources. That is, since all source return components are absent from $E_n$, when angle $\phi$ corresponds to that of a source, $\phi_m$, matrix multiplication of model $a(\phi)$ and $E_n$ will be equal to zero. Since this product is in the denominator, the pseudo-spectrum $P_{MUSIC}(\phi)$ will exhibit peaks at $\phi=\phi_m$, $m \in \{1, 2, \ldots, M\}$.

When the spaces are well separated, the identification of sources in the pseudo-spectrum is clear and straightforward, and MUSIC can discriminate two sources whose directions of arrival are very close to each other. This is an advantage of MUSIC. As mentioned above, MUSIC is conventionally applied to antenna arrays with complex signals having a phase component. It is, however, not applicable in this form to determine TOA delays of real-valued return signals. That is, the conventional MUSIC method is not adapted for use with real signals with only amplitude information for the purpose of determining TOA delays. Some implementations of the techniques described herein provide an adaptation of MUSIC to such signals.

A first step in adapting MUSIC to the determination of TOA delays can be attempted by using complex signals of the form:

$$x(t) = \Sigma_{m=1}^M \alpha_m s(t-\tau_m) + n(t), \quad (18)$$

where $\alpha_m = |\alpha_m| \exp(j\phi_m)$ with j is the imaginary unit. The amplitudes $\alpha_m$ and phases $\phi_m$ are random and the signals $s(t-\tau_m)$ are complex. The number of return echoes corresponds to the parameter M. It is to be noted that for time-based signals, the size of $x(t)$ is not related to the number of antennas, as in DOA estimation applications using antenna arrays, but the number of acquired time samples. The number of samples N depends on the acquisition time for a response after pulse emission. For a given sampling period $T_s$, the number of recorded response samples is increased to extend the range $r_{max}$ of the system. During each sampling period $T_s$, the emitted pulse travels a distance $d_s = v_{light} T_s$. The range $r_m$ to the $m^{th}$ target is given by the relationship $r_m = \frac{1}{2}(n_s d_s) = \frac{1}{2}(v_{light} n_s T_s)$, where $n_s$ is the number of samples separating the $m^{th}$ echo in the return (e.g., the peak of the $m^{th}$ echo) from the emission time $t_0$ of the emitted pulse. As mentioned above, the ½ factor in the computation of $r_m$ comes from the fact that the time duration $n_s T_s$ represents a round-trip time delay of light to and from the target. This modification is one of the modifications to be made to the MUSIC method in some implementations of the present techniques.

Although a time-domain adaptation of MUSIC based on return signals of the form given by Equation (18) may allow TOA delays to be determined, such return signals remain complex, as they include both amplitude and phase information. Therefore, such a time-domain adaptation is not compatible with real-valued return signals in the time domain of the form given by Equation (3), in which the signal vector $\Sigma_{m=1}^M \alpha_m s(\tau_m)$ and the noise vector n are both entirely real, since no phase information is available.

In the conventional MUSIC method, the steering vectors $\phi_m$ in the array steering matrix $A=[a(\phi_1) \ldots a(\phi_M)]$ are models of sources for each direction $\phi_m$ of the M sources of incoming returns. That is, steering vector $a(\phi_m)$ is a model of an ideal or expected signal that would be produced by a source located at an angle $\phi_m$. In the present description, by analogy with the array steering matrix A used in the conventional MUSIC method, a time-delay matrix A may be defined as follows:

$$A(\tau_m) = [a(\tau_1) \ldots a(\tau_M)]. \quad (19)$$

The delay vectors $a(\tau_m)$, have the same number of samples, N, as the digital signal waveforms $x_k$ obtained by sampling and digitization of the return signals $x_k(t)$ received in response to the emission signals, for m ranging from 1 to M and k ranging from 1 to K. Each delay vector $a(\tau_m)$ represents an ideal or expected model of a return signal having a TOF delay $\tau_m$ expressed as an integer number of sampling periods $T_s$.

As described in greater detail below, by using $\tau$ as scanning parameter, a delay model vector $a(\tau)$ can be used to computer a pseudo-spectrum from which TOF information about echoes associated with targets within a scene can be obtained. In some implementations, the model vector $a(\tau)$ is based on a Gaussian echo model produced by perfect reflection off a target of a Gaussian emission. Of course, other implementations can use other pulse shapes as echo model, including, without limitation, rectangular, triangular and raised-cosine. In practice, the expected shape of return echoes is known and related to the pulse shape of emission signals produced by the system emitter. Mathematically, an N×1 delay model vector $a(\tau)$ of Gaussian shape can be expressed as:

$$a(\tau) = \left[ e^{\frac{-(T_s-\tau)^2}{2\sigma^2}} \quad e^{\frac{-(2T_s-\tau)^2}{2\sigma^2}} \quad \ldots \quad e^{\frac{-(NT_s-\tau)^2}{2\sigma^2}} \right]^T, \quad (20)$$

where $\sigma$ is the variance of the pulse and $\tau$ is the TOF delay of the model echo, where $\tau$ may correspond to an integer number of sampling periods.

Returning to FIG. 1, the method 100 includes, as mentioned above, a step 108 of creating a second-order signal matrix of size N×N from the at least one digital signal waveform $x_k$. The at least one digital signal waveform $x_k$ can be given by Equation (6). As also mentioned above, the second-order signal matrix is such that the $n^{th}$ element along its main diagonal is expressed in terms of the square of the $n^{th}$ sample of each of the one or more digital signal waveforms $x_k$. More detail regarding how the second-order signal matrix can be created with the present techniques will now be provided.

In some implementations, principles for constructing the second-order signal matrix based on the at least one digital signal waveform are inspired by or share similarities with principles outlined above for the construction of the covariance matrix $R_{XX}$, or its approximation $\hat{R}_{XX}$, in conventional MUSIC-based DOA estimation using antenna arrays. In Equation (13), the covariance matrix $R_{XX}$ is defined as the expectation value of $X(t)X^H(t)$, where $X(t)$ is a history matrix of size N×K in which the $k^{th}$ column represents the $k^{th}$ of K successive snapshots of N complex-valued samples acquired at the same time on corresponding N spatially spaced-apart receivers of an antenna array. In contrast, in the present techniques, the second-order signal matrix Z may be defined as the expectation value of $X(k)X^T(k)$, where $X(k)$ is a history matrix of size N×K in which the $k^{th}$ column represents the $k^{th}$ of K digital signal waveforms $x_k$ containing N real-valued time samples acquired in response to the $k^{th}$ emission signal. The second-order signal matrix is expressed in terms of the transpose operator T, rather than the Hermitian operator H, because all the entries of X(k) are real. It is noted that by analogy with the conventional covariance matrix, the second-order signal matrix according to the present techniques may, in some instances, be referred to as a "pseudo-covariance matrix" or "covariance-like matrix".

As in conventional MUSIC-based DOA estimation using antenna arrays, it is generally not possible in practice to derive the second-order signal matrix from the expectation value $E[XX^T]$, as this would involve, in principle, acquiring an infinite number of return signals, or snapshots. Rather, in some implementations, the second-order signal matrix can be expressed as follows:

$$\hat{Z} = \frac{1}{K} \sum_{k=1}^{K} x_k x_k^T = \frac{1}{K} XX^T, \quad (21)$$

where $x_k$ and X are given by Equations (6) and (4), respectively. In Equation (21), it is seen that the creating step 108 involves obtaining a matrix product of a first matrix of size N×K, for example X, and a second matrix of size K×N, for example $X^T$, wherein each digital signal waveform $x_k$ is a column of the first matrix and a corresponding row of the second matrix. Developing the matrix product $XX^T$ in Equation (21) yields:

$$\hat{Z} = \frac{1}{K}[x_1 \ x_2 \ \ldots \ x_K]\begin{bmatrix} x_1 \\ x_2 \\ \vdots \\ x_K \end{bmatrix} \quad (22)$$

$$= \frac{1}{K}\begin{bmatrix} x_1(1) & x_2(1) & \ldots & x_K(1) \\ x_1(2) & x_2(2) & \ldots & x_K(2) \\ \vdots & \vdots & \ddots & \vdots \\ x_1(N) & x_2(N) & \ldots & x_K(N) \end{bmatrix}\begin{bmatrix} x_1(1) & x_1(2) & \ldots & x_1(N) \\ x_2(1) & x_2(2) & \ldots & x_2(N) \\ \vdots & \vdots & \ddots & \vdots \\ x_K(1) & x_K(2) & \ldots & x_K(N) \end{bmatrix}$$

$$= \frac{1}{K}\begin{bmatrix} \sum_{k=1}^{K} x_k^2(1) & \sum_{k=1}^{K} x_k(1)x_k(2) & \ldots & \sum_{k=1}^{K} x_k(1)x_k(N) \\ \sum_{k=1}^{K} x_k(2)x_k(1) & \sum_{k=1}^{K} x_k^2(2) & \ldots & \sum_{k=1}^{K} x_k(2)x_k(N) \\ \vdots & \vdots & \ddots & \vdots \\ \sum_{k=1}^{K} x_k(N)x_k(1) & \sum_{k=1}^{K} x_k(N)x_k(2) & \ldots & \sum_{k=1}^{K} x_k^2(N) \end{bmatrix}.$$

From Equation (22), it is noted that the $n^{th}$ element of the main diagonal of the second-order signal matrix $\hat{Z}$ is expressed in terms of the square of the $n^{th}$ sample of each digital signal waveform $x_k$, namely as a summation of $x_k^2(n)$, $k \in \{1, 2, \ldots, K\}$. It is noted that using a second-order signal matrix $\hat{Z}$ expressed in terms of summations of squared samples of K digital signal waveforms can increase the signal-to-noise ratio compared to using any individual digital signal waveform.

Equation (22) indicates that element (i,j) of the second-order signal matrix $\hat{Z}$ represents the average over K snapshots of the product of the signal measured at the $i^{th}$ time sample and the signal measured at the $j^{th}$ time sample. In contrast, element (i,j) of the conventional covariance matrix $\hat{R}_{XX}$ given by Equation (15) represents the average over K snapshots of the product between the signal measured at the $i^{th}$ receiver with the signal measured at $j^{th}$ receiver. Another difference between the second-order signal matrix given by Equation (21) and the conventional covariance matrix given by Equation (15) is their relative size, the former being generally much larger than the latter. The second-order signal matrix $\hat{Z}$ is of size N×N, where N is the number of time samples in the at least one digital signal waveform which, as mentioned above, can typically range from 256 to 2048 or more. For example, if N=512, then the second-order signal matrix $\hat{Z}$ is of size 512×512 for a total of 264,144 elements. In contrast, the covariance matrix $\hat{R}_{XX}$ is also of size N×N, where N is the number of antennas in the antenna array, which in typical implementations can range from 4 to 128. For example, if N=16, then the covariance matrix $\hat{R}_{XX}$ is of size 16×16 for a total of 256 elements, which is significantly less than for a typical implementation of the second-order signal matrix $\hat{Z}$ disclosed herein. It will be understood that for the second-order signal matrix $\hat{Z}$ according to the present techniques, the greater the operating range $r_{max}$, the greater the number of time samples N in the at least one digital signal waveform and the greater the computing complexity.

The form of the second-order signal matrix $\hat{Z}$ given by Equation (21) can yield satisfactory or acceptable results in situations when $\hat{Z}$ contains a single echo or when the number of echoes in $\hat{Z}$ is known, estimated, assumed, modeled or determined independently. Otherwise, the performance of the method 100 may not be optimal. In echo detection and ranging implementations, for example, in lidar implementations, echoes are generally correlated since apart from noise, the digital signal waveforms in the history matrix X are copies of one another acquired from a stationary or nearly stationary scene, typically using a single detector.

Figure 5:
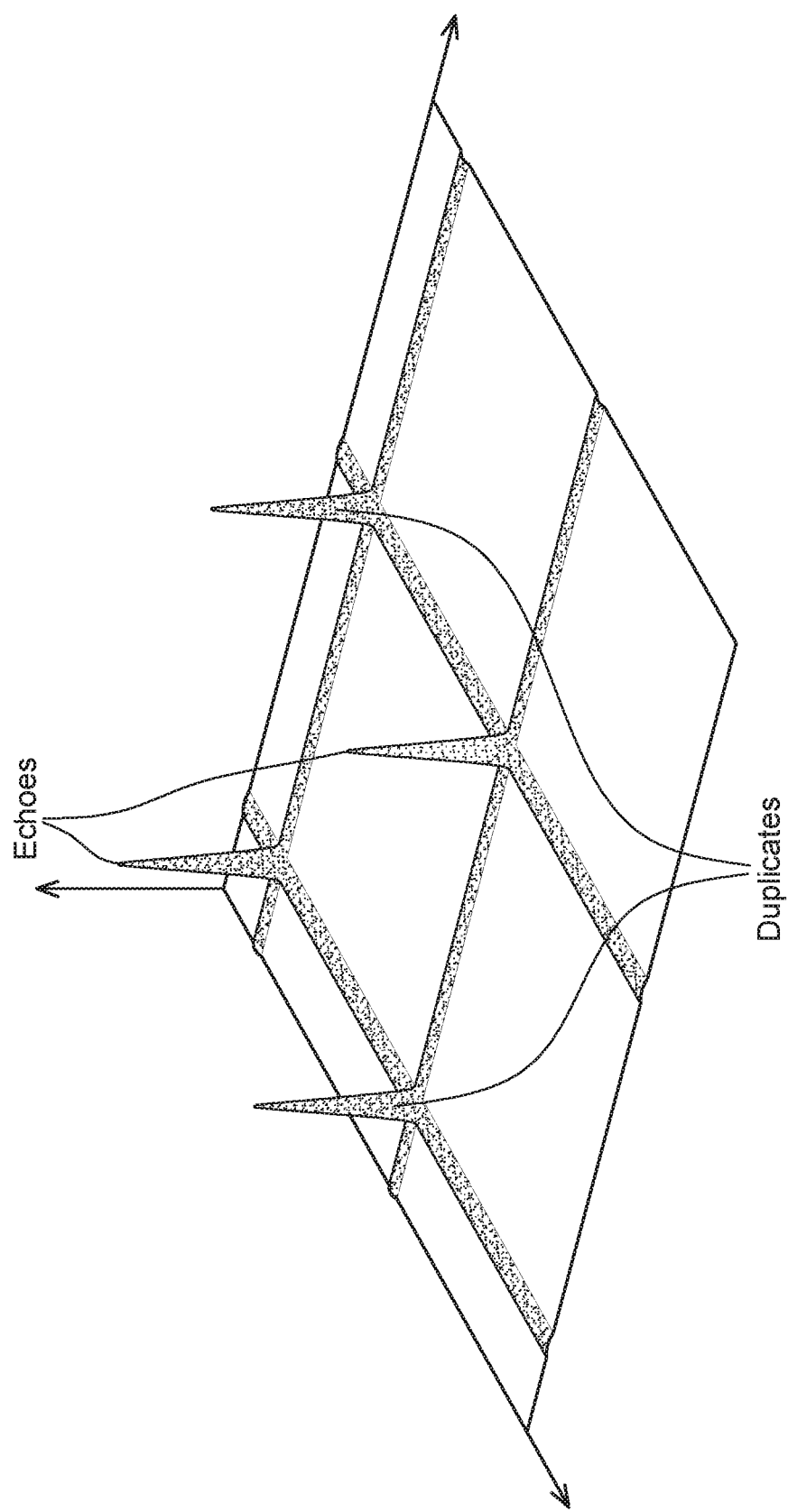
FIG. 5 is a graphical representation of an example of a second-order signal matrix plotted as a 3D surface plot in which the vertical axis represents the amplitude of the matrix elements over all rows and columns. The illustrated second-order signal matrix includes two echoes and two duplicates respectively centered on and offset from its main diagonal.

Due to the manner of creating the second-order signal matrix $\hat{Z}$ of Equation (21), echoes are expected to be found on its main diagonal. Besides echoes, the second-order signal matrix $\hat{Z}$ also typically contains a non-negligible number of off-diagonal duplicates. In the present description, the term "duplicate" refers to a "false" echo—that is, not resulting from the interaction of the emission signal with targets within the scene—whose peak is not centered on the main diagonal of the second-order signal matrix. Duplicates can appear whenever two or more echoes are present in a return signal. They arise during the creation of the second-order signal matrix as a result of the product between two echoes having different time delays. For example, a duplicate located at off-diagonal element (i,j), i≠j, would result from the product between a first echo located at the $i^{th}$ time sample and a second echo located at the $j^{th}$ time sample, summed over K snapshots: $\sum_{k=1}^{K} x_k(i)x_k(j)$, where $x_k(i)$ and $x_k(j)$ correspond to two different echoes originating from two different targets within the scene. Referring to FIG. 5, there is illustrated a graphical representation of an example of a second-order signal matrix $\hat{Z}$ plotted as a 3D surface plot in which the vertical axis represents the amplitude of the matrix elements over all rows and columns. The illustrated second-order signal matrix $\hat{Z}$ includes two echoes and two duplicates respectively centered on and offset from its main diagonal. Duplicates are an indication of echo correlation and their presence in the second-order signal matrix may impair or otherwise affect the echo separation capabilities, especially if they are close to the main diagonal, which is an indication of closely spaced or overlapping echoes.

Returning to FIG. 1, in some implementations, the creating step 108 may include performing an echo decorrelation operation to attenuate or suppress off-diagonal content in the second-order signal matrix $\hat{Z}$, in view of improving the performance of the method 100, notably in terms of its echo discrimination capabilities. The echo decorrelation operation aims to overcome or at least alleviate issues caused by the appearance of duplicated echoes.

Several echo decorrelation approaches in accordance with the present techniques will be described below. It is noted that with respect to the exemplary system embodiments illustrated in FIGS. 2 and 3, the creating step 108 in FIG. 1, including the echo decorrelation operation, can be performed by the processor 228 using computer readable instructions stored in the one or more memory elements 230.

In FIG. 1, in some implementations, the creating step 108 can include a substep of forming an initial second-order matrix $\hat{Z}_0$ of size N×N from the at least one digital signal waveform. The initial second-order matrix $\hat{Z}_0$ has a main diagonal whose $n^{th}$ element is expressed in terms of the square of the $n^{th}$ sample of each digital signal waveform, where n is an integer ranging from 1 to N. In such implementations, the creating step 108 can also include a step of performing an echo decorrelation operation on the initial second-order matrix $\hat{Z}_0$ by reducing off-diagonal elements of the initial second-order matrix $\hat{Z}_0$ to obtain the second-order signal matrix $\hat{Z}$. Examples of approaches to implement these forming and performing substeps will be described below.

In a first approach, referred to herein as a decorrelation preprocessing by anti-diagonal modulation, the substep of forming the initial second-order matrix $\hat{Z}_0$ includes creating each secondary diagonal of the initial second-order matrix $\hat{Z}_0$ using either a subset of the elements on the main diagonal or one or more interpolations between adjacent elements on the main diagonal. In this approach, the step of performing the echo decorrelation operation on the initial second-order matrix $\hat{Z}_0$ includes applying an amplitude modulation to the initial second-order matrix $\hat{Z}_0$ by multiplying each element by a modulation factor having a value that decreases as the distance between the element and the main diagonal of $\hat{Z}_0$ increases. More detail regarding the implementation of the approach of decorrelation preprocessing by anti-diagonal modulation will be given below.

Figure 6A:
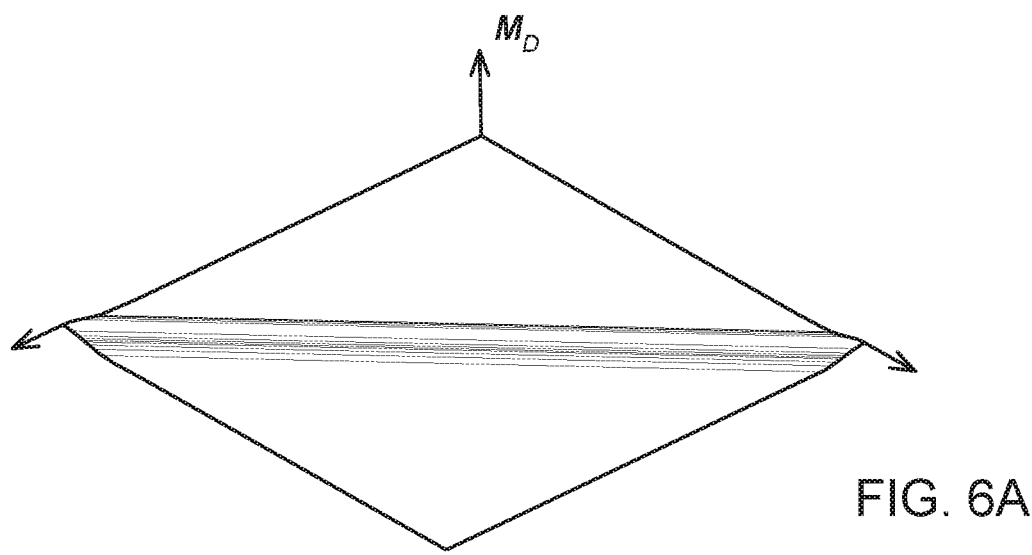
FIG. 6A is a graphical representation of an example of a matrix $M_D$ in which the diagonals are copies of the squared response to a pulse, plotted as a 3D surface plot.
Figure 6B:
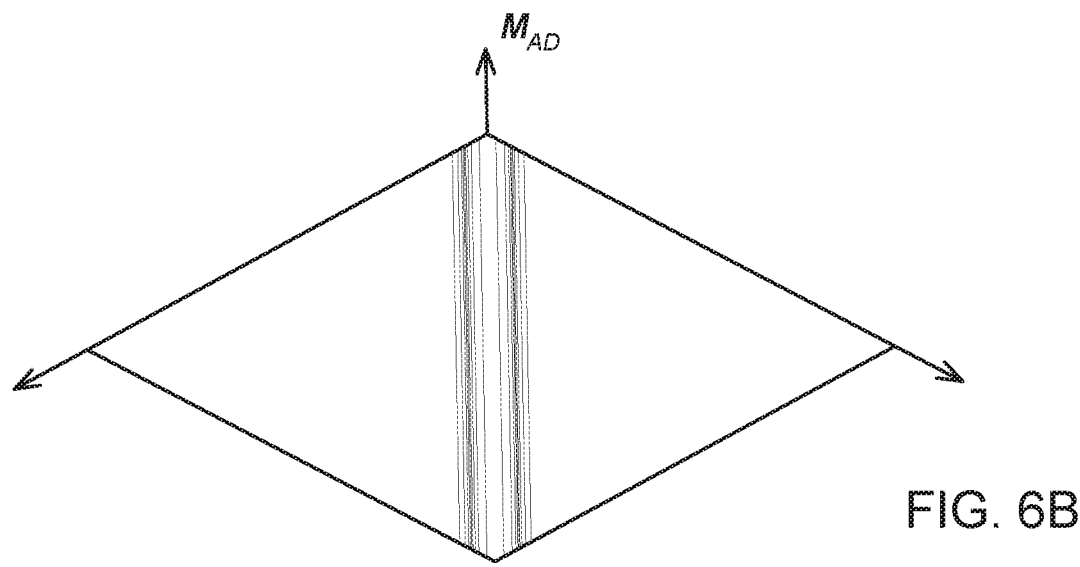
FIG. 6B is a graphical representation of an example of a matrix $M_{AD}$ in which the anti-diagonals are copies of the squared response to the pulse, plotted as a 3D surface plot.
Figure 6C:
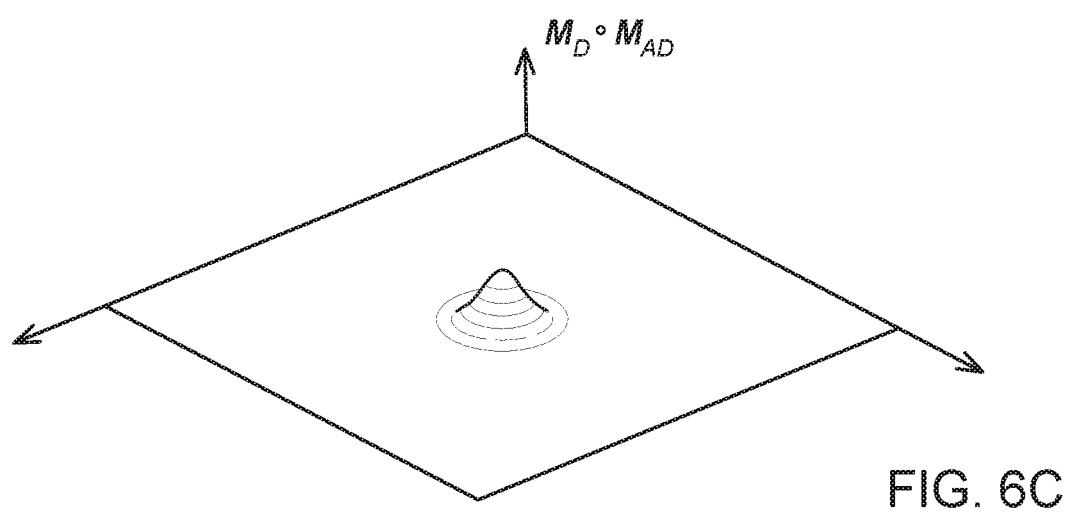
FIG. 6C is a graphical representation of a matrix $M_D \circ M_{AD}$ obtained from the Hadamard produce of $M_D$ and $M_{AD}$, plotted as a 3D surface plot.

As mentioned above, each element on the main diagonal of the second-order signal matrix $\hat{Z}$ given by Equation (21) is a sum of the square elements of the signals. For example, the value of the first element (1, 1) on the main diagonal of $\hat{Z}$ is equal to $x_1^2(1)+x_2^2(1) \ldots +x_K^2(1)$. It is to be noted, however, that this property is true in general only when the second-order signal matrix $\hat{Z}$ is created to determine arrival delays on real signals, as in the present description. Upon examination of the matrix $\hat{Z}$ thus created, it has been recognized that the observed shape of an echo on the anti-diagonal was also a squared pulse, as on the diagonal. An example of this feature is illustrated in FIGS. 6A to 6C, where a three-dimensional echo is obtained by a Hadamard product (point-to-point) of an initial matrix $M_D$, depicted in FIG. 6A, in which the diagonals are copies of the squared response to a pulse, and a second matrix $M_{AD}$, depicted in FIG. 6B, in which the anti-diagonals are copies of the squared response to pulse. The response to the pulse contains a centered echo. The resulting matrix $M_D \circ M_{AD}$, depicted in FIG. 6C, contains an echo that shares similarities with an echo that would be obtained using $XX^T$.

To keep the original echo properties in the second-order signal matrix $\hat{Z}$ given by Equation (21) while eliminating or at least attenuating duplicates, the creation of the second-order signal matrix $\hat{Z}$ by the anti-diagonal modulation decorrelation approach will retain the squared shape of the echoes in the resulting matrix.

As mentioned above, the main diagonal of the initial second-order matrix $\hat{Z}_0$ is formed such that its $n^{th}$ element is expressed in terms of the square of the $n^{th}$ sample of each digital signal waveform $x_k$ forming the history matrix X given by Equation (4). The creation of the secondary diagonals of the initial second-order matrix $\hat{Z}_0$ begins the summation of the squared responses in the history matrix X, as follows $$x_s = \frac{1}{K}\sum_{k=1}^{K} x_k^2. \quad (23)$$

Based on Equation (23), an interpolated sequence can be obtained, such that:

$$x_{s,odd}(n) = \frac{x_s(n) + x_s(n+1)}{2}, n = [1, \ldots, N-1]. \quad (24)$$

Before forming the secondary diagonals of the initial second-order matrix $\hat{Z}_0$, the following notations for its main and secondary diagonals will be defined. The main and secondary diagonals will be defined as column vectors $d_i$, arranged in the matrix as follows, where i is the diagonal index:

$$\hat{Z}_0 = \begin{bmatrix} d_0(1) & d_1(1) & \ldots & d_{N-1}(1) \\ d_{-1}(1) & \ddots & \ddots & \vdots \\ \vdots & \ddots & \ddots & d_1(N-1) \\ d_{-(N-1)}(1) & \ldots & d_{-1}(N-1) & d_0(N) \end{bmatrix}, \quad (25)$$

where $d_0$ is the main diagonal, of size N×1 and $d_i$, $i \in \{-(N-1), \ldots, -2, -1, 1, 2, \ldots, (N-1)\}$, are the secondary diagonals, of size $(N-|i|)\times 1$.

The next step consists in arranging the sequence $x_s$ on the diagonals of even indices in matrix $\hat{Z}_0$ and the interpolated sequence $x_{s,odd}$ on the diagonals of odd indices. Since the diagonals are not all the same length, a sample is eliminated from $x_s$ and $x_{s,odd}$ each time the diagonal index increases or decreases by one as one moves away from the main diagonal $d_0$ whose diagonal index is zero. As it would not be symmetrical to remove a sample from sequence $x_s$ on each iteration on the diagonals, the sequence $x_{s,odd}$ is used. Thus, for the diagonals whose diagonal index i is even, the vector $d_i$ is given by:

$$d_{i,even} = [x_s(1+0.5|i|) \ldots x_s(N-0.5|i|)], \quad (26)$$

$$i \in \{-(N-2), -(N-4), \ldots, 0, \ldots, (N-4), (N-2)\}. \quad (27)$$

Meanwhile, for the diagonals whose diagonal index i is odd, the vector $d_i$ is given by $$d_{i,odd}=[x_{s,odd}(0.5+0.5|i|) \ldots x_{s,odd}(N-0.5-0.5|i|)], \quad (28)$$

$$i \in \{-(N-1),-(N-3),\ldots,-1,1,\ldots,(N-3),(N-1)\}. \quad (29)$$

It is to be noted that Equations (26) to (29) apply when the number of time samples in the at least one digital signal waveform $x_k$ is even. Corresponding relationships can be readily derived when N is odd.

The aim of the anti-diagonal modulation approach is to obtain a second-order signal matrix $\hat{Z}$ in which the echoes are centered on a point on the main diagonal, as in the approach based on computing $XX^T$ given in Equation (21), but with smoothing (i.e., reduction or suppression of unwanted off-diagonal content). In the anti-diagonal modulation approach, this echo decorrelation operation is achieved by applying an amplitude modulation to the initial second-order matrix $\hat{Z}_0$ in which each element of $\hat{Z}_0$ is multiplied by a modulation factor whose value decreases as the distance between the element and the main diagonal of $\hat{Z}_0$ increases. The objective is to attenuate the amplitude of the off-diagonal elements of $\hat{Z}_0$ as a function of their distance from the main diagonal. It is to be noted that the distance from the main diagonal do of a certain off-diagonal element (u, v), u≠v of $\hat{Z}_0$ can be described in terms of the index i of the secondary diagonal vector $d_i$ to which this off-diagonal element (u, v) belongs. In general, the amplitude of the modulation factor applied to the elements of a certain secondary diagonal vector $d_i$ decreases as the absolute value of its index i increases.

In some implementations, the value of the modulation factor decreases on either side of the main diagonal according to a modulation function selected in accordance with a shape of the at least one emission signal. As the shape of echoes is generally known from the shape of the emission signal (e.g., Gaussian or another shape such as rectangular or raised-cosine, for example, whose parameters are also known), echoes in the second-order signal matrix would be expected to have the square of this shape in all directions. To do so, in some implementations, the anti-diagonal modulation approach multiplies the initial second-order matrix $\hat{Z}_0$ element-by-element by a factor which depends on the shape of the emission signal. The modulating shape (e.g., Gaussian or another shape) can be taken to have a peak amplitude equal to unity. The selected modulating shape can be represented by a vector g. It is noted that the construction of the vector g shares similarities with the construction of delay vectors $a(\tau)$ described above with respect to Equation (20), but differs essentially in two respects: the pulse shape contained in vector g is centered in vector g; and the size of g varies as a function of the anti-diagonal of $\hat{Z}_0$ to be modulated. When modulating the main anti-diagonal, g is of size N×1, whereas when modulating the outermost secondary anti-diagonals (i.e., the corners of the matrix), the length g is of size 1×1. For a Gaussian pulse shape, the $i^{th}$ element of g applied to the ith diagonal of $\hat{Z}_0$ can be expressed as follows:

$$g(i) = \exp\left(-\frac{i^2}{2\sigma^2}\right), i \in \{-(N-1), \ldots, N-1\}, \quad (30)$$

where i corresponds to the index of diagonal $d_i$. In this example, each diagonal vector $d_i$ is therefore multiplied by the amplitude of the point of the Gaussian profile corresponding to its position depending on its separation from the main diagonal $d_0$. Thus, for a modulating shape corresponding to the pulse itself, the modulated even diagonals become:

$$d_{i,even}=g(\lceil 0.5N_g+i\rceil)\times[x_s(1+0.5|i|) \ldots x_s(N-0.5|i|)], \quad (31)$$

$$i \in \{-(N-2),-(N-4),\ldots,0,\ldots,(N-4),(N-2)\}, \quad (32)$$

where $N_g$ is the length of vector g, that is, $N_g=2N-1$, and $\lceil x \rceil$ is a ceiling operator that maps a real number x to the smallest integer that is greater than or equal to x. Meanwhile, the modulated odd diagonals become:

$$d_{i,odd}=g(\lceil 0.5N_g+i\rceil)\times[x_{s,odd}(0.5+0.5|i|) \ldots x_{s,odd}(N-0.5-0.5|i|)], \quad (33)$$

$$i \in \{-(N-1),-(N-3),\ldots,-1,1,\ldots,(N-3),(N-1)\}. \quad (34)$$

Figure 7A:
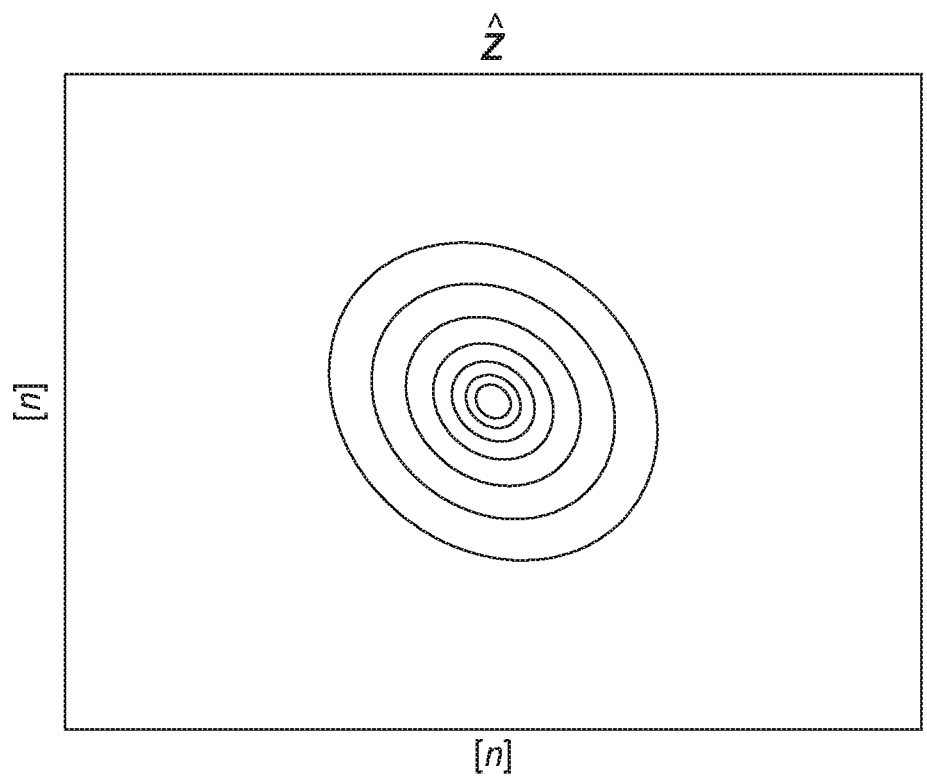
FIG. 7A is a graphical representation of an example of a second-order signal matrix, plotted as a contour plot, obtained using an anti-diagonal modulation echo decorrelation scheme in which the modulation function has a profile proportional to the profile of the emission signal.
Figure 7B:
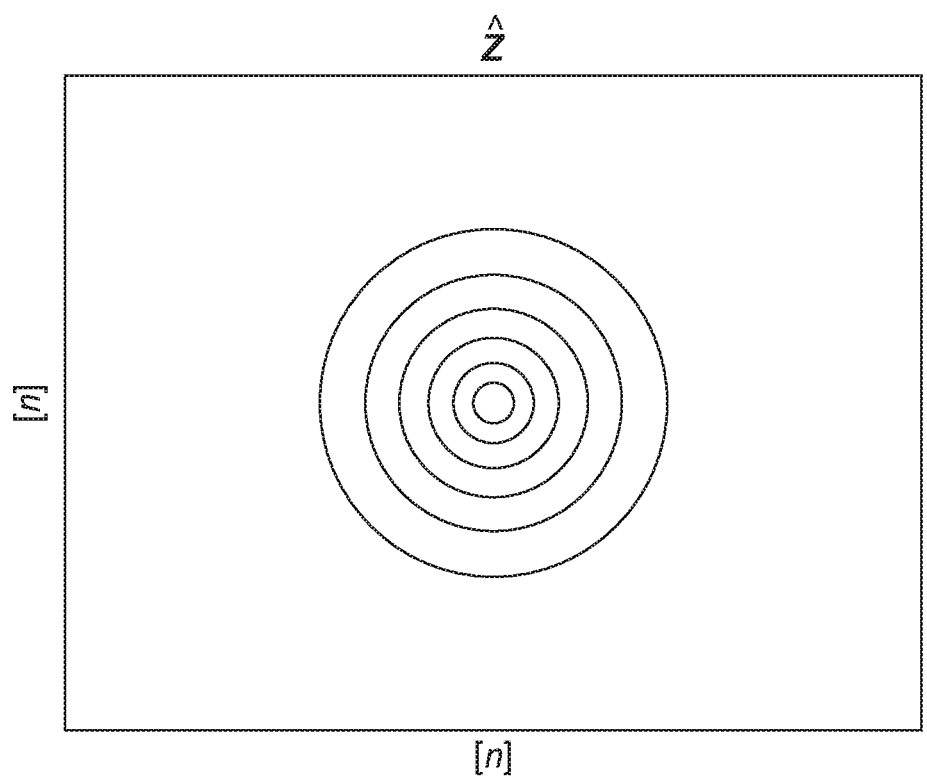
FIG. 7B is a graphical representation of an example of a second-order signal matrix, plotted as a contour plot, obtained using an anti-diagonal modulation echo decorrelation scheme in which the modulation function has a profile proportional to the square root of the profile of the emission signal.

Referring to FIGS. 7A and 7B, contour plots of two examples of a second-order signal matrix $\hat{Z}$ obtained by applying anti-diagonal modulation to an initial second-order matrix $\hat{Z}_0$ constructed using Equation (25) are illustrated. In FIG. 7A, the modulation function has a profile proportional to the profile of the emission signal. It is seen that the echo obtained in $\hat{Z}$ is narrower along the anti-diagonal direction than along the diagonal direction. Meanwhile, in FIG. 7B, the modulation function has a profile proportional to the square root of the profile of the emission signal ($g^{1/2}$), which produces a symmetrical echo along the diagonal and anti-diagonal directions of $\hat{Z}$. It will be understood that the shape of the square root of the model pulse is equivalent to the shape of a pulse whose Gaussian variance parameter $\sigma^2$ is equal to the variance of the model pulse multiplied by the square root of 2.

Returning to FIG. 1, in a second echo decorrelation approach that can be used during the creating step 108 of the method 100, the initial second-order matrix $\hat{Z}_0$ can be obtained from Equation (21). That is, $\hat{Z}_0$, is obtained as a matrix product of a first matrix of size N×K, that is, X, and a second matrix of size K×N, that is, $X^T$, wherein each digital signal waveform is a column of the first matrix and a corresponding row of the second matrix, such that $$\hat{Z}_0 = \frac{1}{K}XX^T.$$

This second approach can be referred to herein as a decorrelation preprocessing by modulation with a model or conditioning matrix. In this approach the step of performing the echo decorrelation operation on the initial second-order matrix $\hat{Z}_0$ includes obtaining the second-order signal matrix $\hat{Z}$ as a Hadamard product of the initial second-order matrix $\hat{Z}_0$ and a conditioning matrix G. This can be expressed mathematically as follows:

$$\hat{Z} = \hat{Z}_0 \circ G = \frac{1}{K}XX^T \circ G. \quad (35)$$

Depending on the application, the conditioning matrix can take various shapes, two of which will be presented below.

First, in some implementations, the conditioning matrix G can be a band matrix of size N×N in which the element G(i, j) is equal to 1 if $|i-j| \leq B$ and 0 elsewhere, where i and j are integers ranging from 1 to N, and B is a bandwidth parameter of the band matrix. As known in the art, a band matrix is a matrix having non-zero entries on a diagonal band including the main diagonal, and null entries elsewhere.

Second, in other implementations, the conditioning matrix G can be expressed as follows:

$$G = \sum_{n=1}^{N} a(\tau_n) a^T(\tau_n), \quad (36)$$

where the $a(\tau_n)$ is a model vector of size N×1 representing a model of an echo waveform having a time of arrival $\tau_n$ corresponding to the $n^{th}$ sampling time of the set of N sequential sampling times used to form X, and the superscript T denotes the transpose operator. For a Gaussian echo waveform model, the model vector $a(\tau_n)$ can be expressed as follows:

$$a(\tau_n) = \left[ e^{\frac{-(T_s - \tau_n)^2}{2\sigma^2}} \quad e^{\frac{-(2T_s - \tau_n)^2}{2\sigma^2}} \quad \ldots \quad e^{\frac{-(NT_s - \tau_n)^2}{2\sigma^2}} \right]^T, \quad (37)$$

where $\tau_n = nT_s$, $n \in \{1, 2, \ldots N\}$, with $T_s$ the sampling period at which the at least one digital signal waveform $x_k$ in X are sampled and sampled and digitized. The conditioning matrix G given by Equation (36) can be interpreted as a succession of pulses whose peaks, centered on its main diagonal, are separated by a single sample.

It is noted that the echo decorrelation technique based on a conditioning matrix G and the echo decorrelation technique based on an anti-diagonal modulation share similarities in that both techniques involve modulating an initial, "covariance-like" second-order matrix $\hat{Z}_0$ by a modulating function g or G, for example having Gaussian shape, characterized by a certain exponent along the anti-diagonal direction. However, the approach based on the conditioning matrix G does not include any interpolations, as for odd diagonals in the anti-diagonal modulation approach, and thus may involve fewer approximations.

Figure 8A:
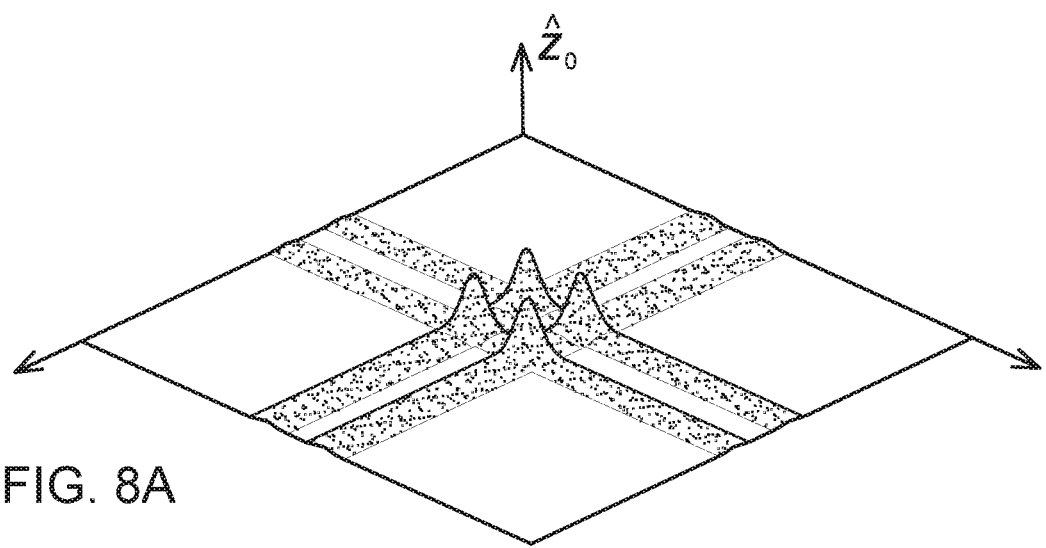
FIG. 8A is a graphical representation of an example of an initial second-order matrix, plotted as a 3D surface plot, for use in an echo decorrelation scheme based on a conditioning matrix.
Figure 8B:
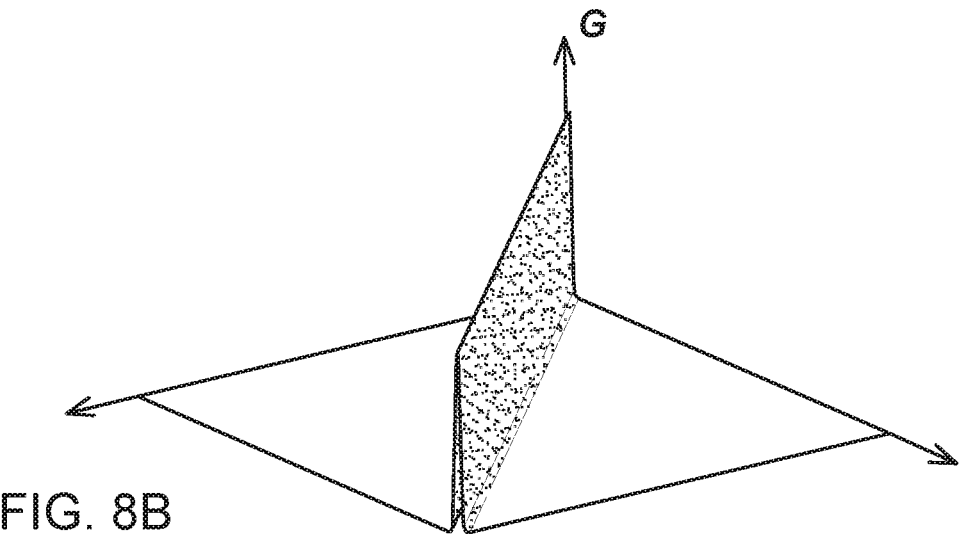
FIG. 8B is a graphical representation of an example of a conditioning matrix built from echo waveform model vectors, plotted as a 3D surface plot.
Figure 8C:
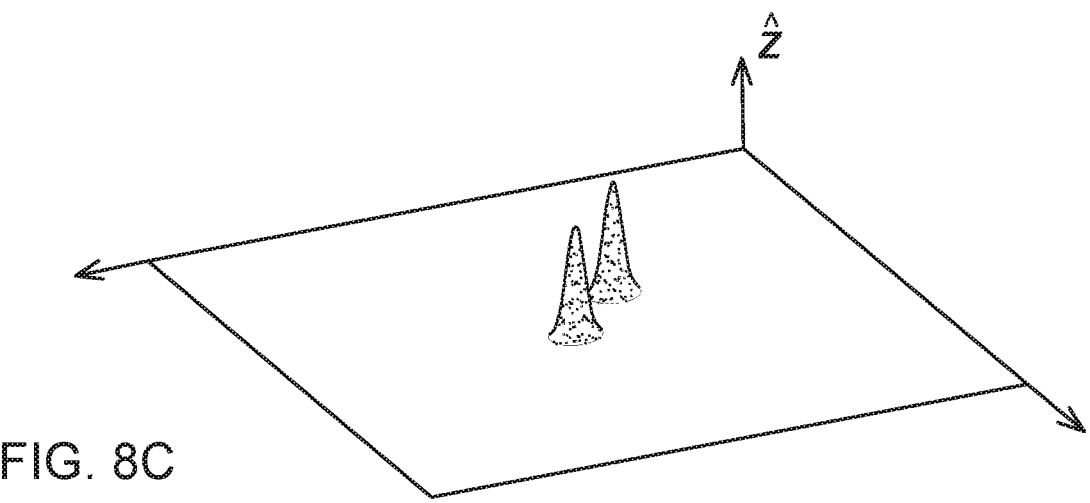
FIG. 8C is a graphical representation of a second-order signal matrix obtained from the Hadamard product of the initial second-order matrix of FIG. 8A and the conditioning matrix of FIG. 8B.

Referring to the 3D surface plots of FIGS. 8A to 8C, FIG. 8A is a graphical representation of an example of an initial second-order matrix $\hat{Z}_0$, FIG. 8B is a graphical representation of a conditioning matrix G, and FIG. 8C is a graphical representation of a second-order signal matrix $\hat{Z}$ obtained from the Hadamard product of the initial second-order matrix $\hat{Z}_0$ of FIG. 8A and the conditioning matrix G of FIG. 8B. Comparing $\hat{Z}_0$ in FIG. 8A and $\hat{Z}$ in FIG. 8C, it is seen that this echo decorrelation scheme can significantly reduce the amplitude of duplicates in $\hat{Z}$ with respect to the amplitude of duplicates in $\hat{Z}_0$. It is noted that this technique tends to modify the shape of an echo in the second-order signal matrix $\hat{Z}$. In FIG. 8A, the original echo in $\hat{Z}_0$ has a round shape. In FIG. 8C, however, the effect of the conditioning matrix G is to narrow the echo along the anti-diagonal direction, but not along the diagonal direction. The modulated echo in $\hat{Z}$ therefore has an oval shape.

Returning to FIG. 1, a third echo decorrelation approach that can be used during the creating step 108 of the method can be referred to herein as a decorrelation preprocessing by shifted superposition. This technique can be used with amplitude-only signals and involves splitting the history matrix X given by Equation (4) along its rows to produce submatrices containing a reduced number of vectors. Two versions of the technique will be presented: with and without overlap.

The case with overlap will be considered first. The technique begins by splitting the digital signal waveforms $x_k$ into subsections $x_{p,k}$ of length $L_p$ at least equal to the length of a pulse. The P subsections $x_{p,k}$ are thus obtained, where:

$$P = N - L_P + 1. \quad (38)$$

Thus, splitting the $k^{th}$ digital signal waveform $x_k$ yields:

$$x_{1,k} = \begin{bmatrix} x_{1,k} \\ \vdots \\ x_{L_p,k} \end{bmatrix} \quad x_{2,k} = \begin{bmatrix} x_{2,k} \\ \vdots \\ x_{L_p+1,k} \end{bmatrix} \ldots x_{P,k} = \begin{bmatrix} x_{P,k} \\ \vdots \\ x_{N,k} \end{bmatrix}, \quad (39)$$

where N is the number of samples in $x_k$.

The next step involves creating vectors $s_{p,k}$ of length N to implement spatial smoothing upon creating the second-order signal matrix $\hat{Z}$. The $s_{p,k}$ vectors can be written as:

$$s_{1,k} = \begin{bmatrix} x_{1,k} \\ 0 \\ \vdots \\ 0 \\ 0 \end{bmatrix} \quad s_{2,k} = \begin{bmatrix} 0 \\ x_{2,k} \\ 0 \\ \vdots \\ 0 \end{bmatrix} \ldots s_{P,k} = \begin{bmatrix} 0 \\ 0 \\ \vdots \\ 0 \\ x_{P,k} \end{bmatrix}. \quad (40)$$

The final step is the formation of the second-order signal matrix $\hat{Z}$ as follows:

$$\hat{Z} = \frac{1}{L_P \times K} \sum_{p=1}^{P} \sum_{k=1}^{K} s_{p,k} s_{p,k}^T. \quad (41)$$

Because some elements of $s_{p,k} s_{p,k}^T$ are added to some of the elements of $s_{p+1,k} s_{p+1,k}^T$ during the creation of $\hat{Z}$, this variant shifted superposition is said to be "with overlap". In Equation (41), $\hat{Z}$ is filled mostly with zeros. This is because it has only $2L_p - 1$ diagonals with non-zero elements, that is, a main diagonal and $L_p - 1$ subdiagonals on each side.

The case without overlap is based on the approach with overlap, but differs in that non-zero elements already present in $\hat{Z}$ via $s_{p,k} s_{p,k}^T$ are not added to elements of $s_{p+1,k} s_{p+1,k}^T$. That is, only the elements obtained by $s_{p+1,k} s_{p+1,k}^T$ corresponding to null elements in $\hat{Z}$ are retained. In shifted superposition with overlap, vectors $s_{p,k}$ were filled with zeros, except for a subsection equal to a portion of length $L_p$ of response vector $x_k$. These vectors are also the starting point for the case of shifted superposition without overlap. With these vectors, intermediate submatrices $\hat{Z}_p$ are created as follows:

$$\hat{Z}_p = \sum_{k=1}^{K} s_{p,k} s_{p,k}^T. \quad (42)$$

The second-order signal matrix $\hat{Z}$ is obtained as a summation of the intermediate matrices $\hat{Z}_p$. However, on each summation of an intermediate matrix, only the elements of the final matrix set to zero are summed. Non-null elements retain their values and are not summed, yielding:

$$\hat{Z}(i, j) = \begin{cases} \hat{Z}_p(i, j) & \text{when } \sum_{k=1}^{p-1} \hat{Z}_k(i, j) = 0 \\ Z(i, j) & \text{otherwise} \end{cases}. \quad (43)$$

It is noted that the variant without overlap generally involves less computation than the variant with overlap, since the former does not subject non-zero elements to further summation.

Figure 9A:
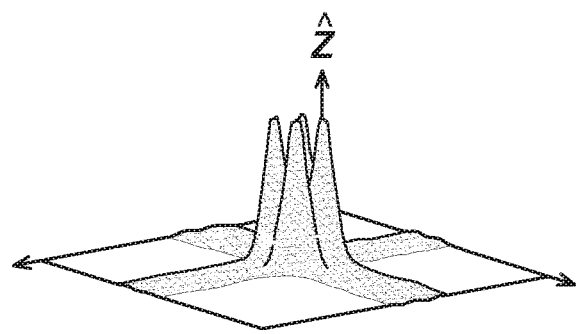
FIGS. 9A to 9F are graphical representations of second-order signal matrices created using different approaches, plotted as 3D surfaces plots in which the vertical axis represents the amplitude of the matrix elements over all rows and columns.
Figure 9B:
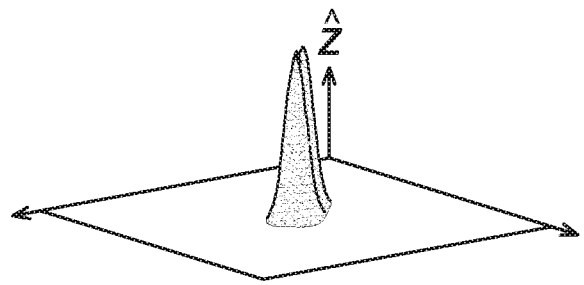
Figure 9C:
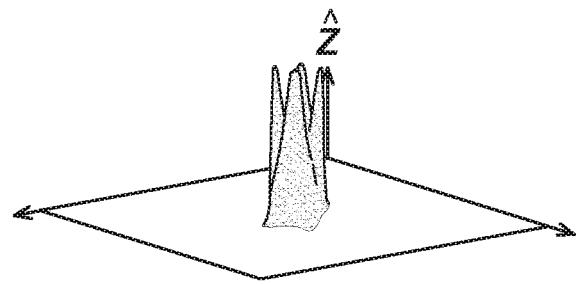
Figure 9D:
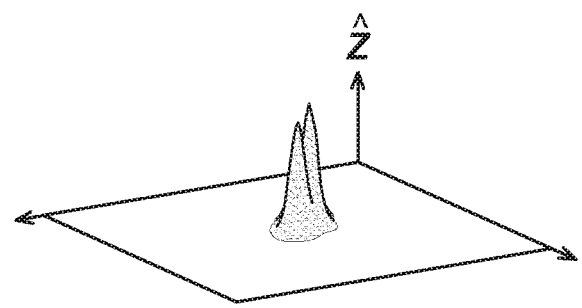
Figure 9E:
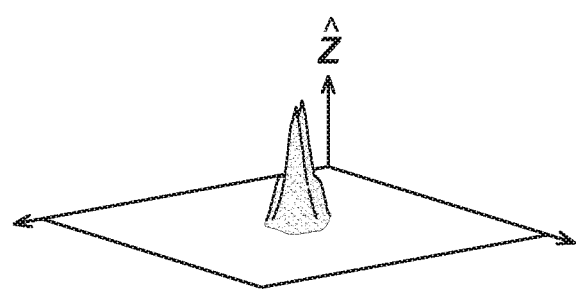
Figure 9F:
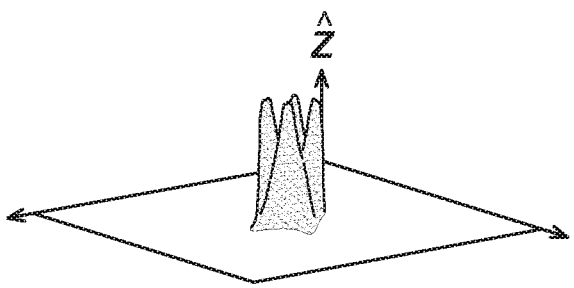

Referring to FIGS. 9A to 9F, there are depicted 3D surface plots of second-order signal matrices $\hat{Z}$ obtained using different approaches for K=8 and a SNR of 11.2 dB: using Equation (21) (FIG. 9A); using the anti-diagonal modulation echo decorrelation technique (FIG. 9B); using a conditioning matrix corresponding to a band matrix (FIG. 9C); using the conditioning matrix given by Equation (36) (FIG. 9D); using the shifted superposition echo decorrelation technique with overlap (FIG. 9E); and using the shifted superposition echo decorrelation technique without overlap (FIG. 9F). In each of FIGS. 9A to 9F, the vertical axis represents the amplitude of the matrix elements over all rows and columns. It is seen that the importance of duplicates in $\hat{Z}$ varies depending on how the second-order signal matrix $\hat{Z}$ is created. Some creation methods reduce or eliminate duplicates more than others. The approach of FIG. 9A retains all the duplicates, whereas the approaches of FIGS. 9C and 9F suppress all the duplicates or portions of duplicates located outside the spatial smoothing window extending on either side of the main diagonal. The approach of FIG. 9E produces the same effect as the approach of FIG. 9F, in addition to a reduction in the amplitudes of duplicates by accumulation. Finally, the approaches of FIGS. 9B and 9D produce essentially no duplicates, leading to improved performance in terms of echo discrimination capabilities.

Returning to FIG. 1, the method 100 includes, as mentioned above, a step 110 of deriving time-of-flight information associated with the one or more echoes based on the second-order signal matrix $\hat{Z}$, the derived time-of-flight information being indicative of range information associated with the one or more targets. More detail regarding how the second-order signal matrix $\hat{Z}$ can be used to time-resolve the one or more echoes and, therefrom, obtain an indication of a range to each target, will now be provided.

In some implementations, the deriving step 110 can include a substep of performing an eigendecomposition of the second-order signal matrix $\hat{Z}$ to generate a set of N eigenvalues $\lambda_n$ and a corresponding set of N eigenvectors $v_n$ for the second-order signal matrix $\hat{Z}$, such that:

$$\hat{Z} = \sum_{n=1}^{N} \lambda_n v_n v_n^T = V \Lambda V^T, \quad (44)$$

where V is an eigenvector matrix whose columns are the eigenvectors $v_n$, of $\hat{Z}$ and $\Lambda$ is a diagonal matrix whose entries are the eigenvalues $\lambda_n$ of $\hat{Z}$. The eigenvalues can be arranged on the main diagonal of matrix $\Lambda$ in descending order. Since the second-order signal matrix $\hat{Z}$ is symmetric matrix (i.e., $\hat{Z}=\hat{Z}^T$) whose elements are all real numbers, its eigenvalues $\lambda_n$ and its eigenvectors $v_n$ all real quantities. The presence of complex numbers in the elements of $\hat{Z}$ would therefore provide an indication that an underlying problem has arisen, for example related to the method used for forming $\hat{Z}$ and/or to the eigendecomposition method. In some implementations, the eigendecomposition can be performed using the corresponding MATLAB™ function. However, other implementations can use other eigendecomposition methods and algorithms.

In some implementations, the deriving step 110 can include a substep of generating a time-domain pseudo-spectrum P($\tau$) based on the eigendecomposition. In some implementations, the generation of the time-domain pseudo-spectrum P($\tau$) can include determining a noise subspace $E_n$ from the eigendecomposition.

The determination of the noise subspace $E_n$ can involve steps of identifying one or more eigenvalues among the N eigenvalues as one or more signal eigenvalues associated with the one or more echoes to be detected in the at least one return signal; identifying the remaining ones of the N eigenvalues as noise eigenvalues; and generating the noise subspace $E_n$ from the eigenvectors corresponding to the noise eigenvalues. A corresponding signal subspace $E_s$ can be generated based on the signal eigenvectors. If the number of targets within the scene is M, then there should be M signal eigenvalues and eigenvectors and (N−M) noise eigenvalues and eigenvectors. Accordingly, the signal subspace $E_s$ would be of size N×M and the noise subspace $E_n$ would be of size N×(N−M).

Depending on the application, various techniques can be used to separate the signal eigenvalues from the noise eigenvalues. In general, eigenvalues corresponding to echoes are larger than eigenvalues corresponding to the average noise level. The smallest eigenvalues tend toward zero. Therefore, in some implementations, the identification of the one or more signal eigenvalues can be made based on a threshold-based criterion. For example, the signal eigenvalues can be selected as those eigenvalues that are greater than a noise eigenvalue threshold or as those eigenvalues that are greater than the arithmetic mean $$\frac{1}{N} \sum_{n=1}^{N} \lambda_n$$

of the N eigenvalues. However, when the echoes are numerous and/or at least partially superimposed and/or buried in noise, discriminating the signal eigenvalues from the noise eigenvalues may become complex or challenging. It is to be noted that any error in the application of the selected discrimination method may have repercussions on the overall performance of the method 100. The generation of the signal and noise subspace matrices $E_s$ and $E_n$ is not trivial, and establishing an optimal or acceptable discrimination criterion for a specific implementation may not be straightforward. Several high-performance criteria exist DOA estimation applications in antenna arrays, but in general they cannot be directly applied to the present techniques, leading to modifications to existing criteria and the establishment of new criteria. This is due, at least in part, to the fact that the second-order signal matrix $\hat{Z}$ is large and all its elements are real numbers that contain no phase information.

In some implementations, the Akaike information criterion (AIC), an eigenspace separation criterion often used in antenna processing, can be used to separate the signal and noise eigensubspaces by evaluating which eigenvalues represent a signal contribution. More particularly, the AIC may be used to determine how many eigenvalues are associated with the signals. In some implementations, the AIC can be implemented as:

$$AIC(q) = -2 \log\left[-K(N-q) \times \log\left(\sum_{n=q+1}^{N} \frac{\lambda_n}{N-q}\right)\right], \quad (45)$$

$$q \in \{0, 1, \ldots, N\},$$

where q is the variable of the number of signals to be determined. The eigenvalues, in descending order, are represented by $\lambda_n$, $n \in \{1, 2, \ldots, N\}$. For antenna processing, the number M of signals present is indicated by the value of q which minimizes the function AIC(q). It has been found that this approach generally does not work well on real signals for determining arrival delays. However, it has also been found that, in some implementations, the location where there is the largest slope variation in the AIC(q) function can provide a good estimation of the signal eigenvalues. In other words, it has been found that an adaptation of the Akaike criterion linking the number of echoes M to the location of the minima of the derivative of the AIC(q) function can provide satisfactory or acceptable performance under some circumstances. In other circumstances, however, such an adaptation of the Akaike criterion may not perform as well, for example when the SNR of the signals drops, yet without coming close to the algorithm detection limit.

In some implementations, a threshold-based criterion can be used for separating $E_s$ and $E_n$, according to which any eigenvalue above a predetermined threshold is considered to represent a signal (e.g., an echo) and its associated eigenvector is included in the signal subspace, and any eigenvalue below that threshold is considered as noise and its associated eigenvector is included in the noise subspace. Advantages of this method are its simplicity and low computation cost. However, although easy to use, this criterion is not without limitations, for example when there is a considerable difference between the amplitudes of the echoes of a given response.

Once the signal subspace $E_s$ and the noise subspace $E_n$ have been formed, the time-domain pseudo-spectrum $P(\tau)$ can be generated based on the noise subspace $E_n$ by providing a model vector $a(\tau)$ of N elements representing an echo waveform model having an adjustable time of arrival $\tau$, and projecting the model vector $a(\tau)$ onto the noise subspace $E_n$ while varying the time of arrival $\tau$ of the echo waveform model in a range defined from the set of N sequential sampling times. In such implementations, the time-domain pseudo-spectrum can be expressed as follows:

$$P(\tau) = \frac{1}{a(\tau)^T E_n E_n^T a(\tau)} = \qquad (46)$$
$$\left[ \frac{1}{a(\tau_1)^T E_n E_n^T a(\tau_1)} \quad \frac{1}{a(\tau_2) E_n E_n^T a(\tau_2)} \quad \cdots \quad \frac{1}{a(\tau_J)^T E_n E_n^T a(\tau_J)} \right]$$

where J is the number of points in $P(\tau)$ and the model vector $a(\tau)$ with adjustable time of arrival $\tau$ can be expressed as:

$$a(\tau) = \left[ e^{\frac{-(T_s-\tau)^2}{2\sigma^2}} \quad e^{\frac{-(2T_s-\tau)^2}{2\sigma^2}} \quad \cdots \quad e^{\frac{-(NT_s-\tau)^2}{2\sigma^2}} \right]^T. \qquad (47)$$

Since the model vector $a(\tau)$ is orthogonal to the noise subspace $E_n$ when $\tau$ matches the TOA delay of an echo, the pseudo-spectrum $P(\tau)$ of Equation (46) exhibits peaks at locations where echoes are present in the at least one return signal. These peaks correspond to the poles of $P(\tau)$. As such, the deriving step 110 can include substeps detecting one or more peaks in the time-domain pseudo-spectrum, and determining the time-of-flight information associated with the one or more echoes based on the detected one or more peaks. It is noted that the matrix $E_n E_n^T$ defines the noise subspace projector $P_n$.

The time-of-flight information can be the location of each echo resolved to the nearest time sample. In some implementations, the location of echoes may be determined with subsample precision if the time separation between successive points in $P(\tau)$ is less than the sampling period $T_s$. If the number of eigenvectors belonging to $E_s$ is underestimated when separating the subspaces, the number of peaks present in the pseudo-spectrum will be reduced, and consequently some targets will not be detected. Conversely, if the number of eigenvectors in $E_s$ is overestimated, additional peaks will appear, possibly leading to false detections. These additional peaks are generally of lower amplitude than those of real echoes. However, when the echo SNR is at or near the detection limit, echo peaks and false peaks can be of similar amplitudes.

Once the locations of the echoes have been determined, the ranges to the associated can be obtained from the TOF principle using the following relationship: $r_m = \frac{1}{2}(v_{light} \times \tau_m)$, where $r_m$ is the range to the $m^{th}$ target corresponding to the $m^{th}$ echo located at $\tau_m$.

In some implementations, the generation of the time-domain pseudo-spectrum can include a step of generating the noise subspace projector $P_n$ from the signal subspace $E_s$ instead of the noise subspace $E_n$. This step can be performed for several reasons. First, the eigenvectors in the noise subspace $E_n$ are generally associated with eigenvalues that can be almost zero. As such, the numerical computation of the noise eigenvectors can sometimes be unstable. Second, it can reduce computing costs. This is because, since the noise eigenvectors are generally much more numerous than the signal eigenvectors, it is generally costlier in terms of computation power to multiply the $E_n E_n^T$ matrix than the $E_s E_s^T$ matrix. Because the matrices are symmetrical, the eigenvectors are orthonormal to one another and the following formula holds: $E_n E_n^T + E_s E_s^T = I$, where I is an identity matrix of dimension N×N. By placing the projector in the noise space, $P_n = E_n E_n^T$, the noise space is obtained as $P_n = I - E_s E_s^T$, that is, as the orthogonal complement of the signal subspace. In such implementations, Equation (47) for the pseudo-spectrum $P(\tau)$ can be modified as follows:

$$P(\tau) = \frac{1}{a(\tau)^T P_n a(\tau)}. \qquad (48)$$

It is noted that the pseudo-spectrum $P(\tau)$ given by Equations (47) and (48) is not a spectrum per se, since its amplitude is relative and not an absolute quantity, for example power. This is because a pseudo-spectrum peak can be higher than its neighbor, even though the power of the source it represents is lower. The higher amplitude of a peak simply means that the orthogonality between the model vector $a(\tau)$ and the noise subspace $E_n$ is better or, in other words, that the contents of the signal subspace $E_s$ are a better match to the contents of the model. Since the projector $P_n$ corresponds to a matrix from which $E_s$ is subtracted, the more $a(\tau)$ tends to resemble $E_s$, the more orthogonal it is to $E_n$, since the two eigensubspaces are orthogonal to each other.

In some implementations, the echo waveform model used to form the model vector $a(\tau)$ can be adapted to the method used to create the second-order signal matrix $\hat{Z}$, such as to provide a better fit between the model vector $a(\tau)$ and the eigenvectors obtained from the eigendecomposition. For example, as mentioned above, when the second-order signal matrix $\hat{Z}$ is created using the echo decorrelation technique with anti-diagonal modulation, the modulation function may be selected to have a profile proportional to the square root of the profile of the emission signal. In such a case, the model vector $a(\tau)$ may be adjusted accordingly as follows:

$$a(\tau) = \left[ e^{-\alpha \frac{(T_s-\tau)^2}{2\sigma^2}} \quad e^{-\alpha \frac{(2T_s-\tau)^2}{2\sigma^2}} \quad \cdots \quad e^{-\alpha \frac{(NT_s-\tau)^2}{2\sigma^2}} \right]^T, \qquad (49)$$

where $\alpha = 2^{1/2}$ is a fit parameter. Of course, the fit parameter $\alpha$ can have other values in other implementations. In yet other implementations, it may be envisioned to adjust the profile of the model vector used to generate the pseudo-spectrum in accordance with the model vector used to generate the conditioning matrix G in Equation (36).

Figure 10:
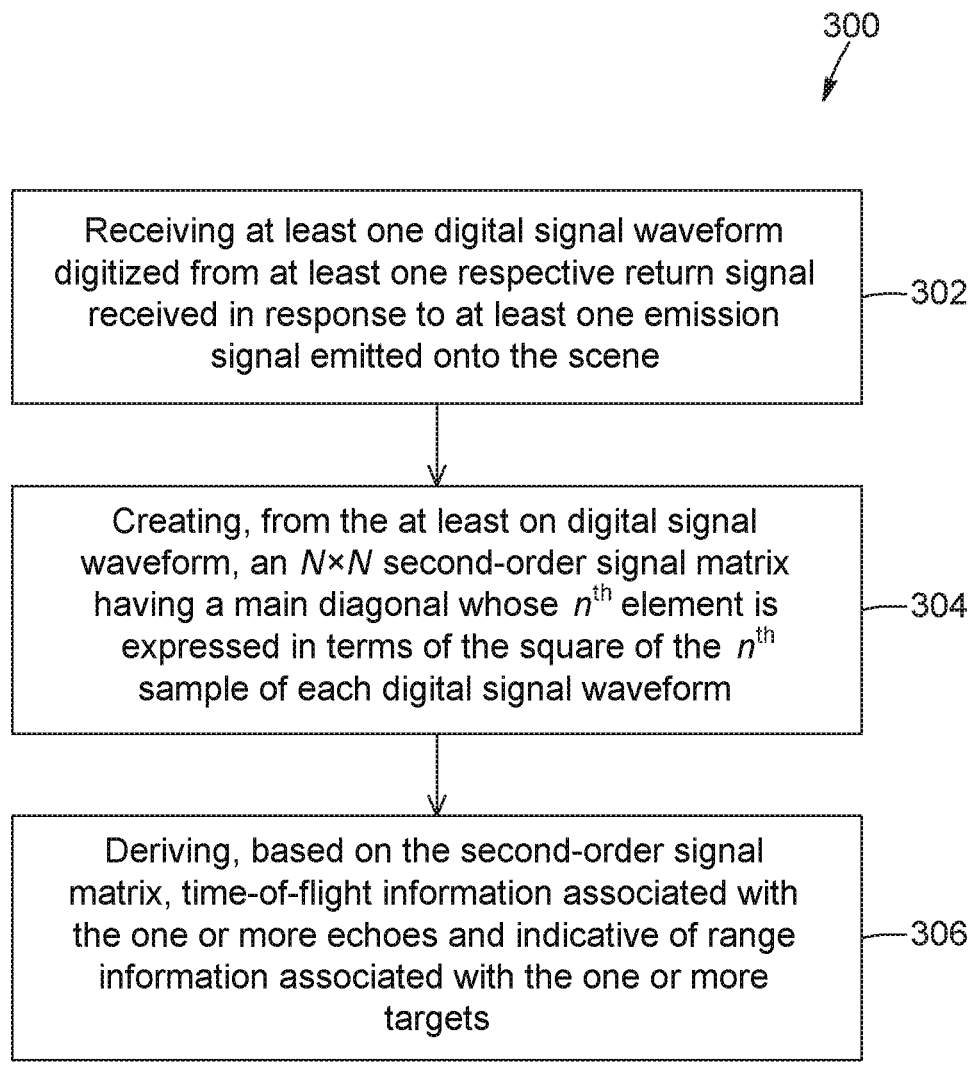
FIG. 10 is a flow diagram of a computer-implemented method for detecting and ranging one or more targets within a scene, in accordance with a possible embodiment.

According to another aspect, there is provided a non-transitory computer readable storage medium having stored thereon computer readable instructions that, when executed by a processor, cause the processor to perform a computer-implemented method for detecting and ranging one or more targets within a scene, such as described herein. Referring to FIG. 10, there is provided a flow diagram of an embodiment of a method 300 for detecting and ranging one or more targets within a scene.

In the present description, the terms "computer readable storage medium" and "computer readable memory" are intended to refer to a non-transitory and tangible computer product that can store and communicate executable instructions for the implementation of various steps of the method disclosed herein. The computer readable memory can be any computer data storage device or assembly of such devices. The computer readable memory can include one or more of electrical charge-based storage media such as, for example, random-access memory (RAM), dynamic RAM, read-only memory (ROM) and electrically erasable programmable ROM (EEPROM); magnetically readable storage media such as, for example, magnetic hard drives, floppy disks and magnetic tapes; optically readable storage media such as, for example, compact discs (CDs or CDROMs), digital video discs (DVD) and Blu-Ray™ discs; solid state drives such as, for example, flash drive memories; and other non-transitory memory technologies. A plurality of such storage devices may be provided, as can be understood by those skilled in the art. The computer readable memory may be associated with, coupled to, or included in a computer or processor configured to execute instructions contained in a computer program stored in the computer readable memory and relating to various functions associated with the computer or processor.

In FIG. 10, the computer-implemented method 300 can include a step 302 of receiving, by a processor, at least one digital signal waveform digitized from at least one respective return signal received in response to at least one emission signal emitted onto the scene, each at a respective emission time. Each return signal includes one or more echoes to be detected produced by reflection of the respective at least one emission signal from the one or more targets. Each digital signal waveform includes a set of N real-valued samples representing the respective return signal at a same set of N sequential sampling times elapsed after the emission time of the respective emission signal. Depending on the application, the at least one emission signal may consist of a single emission signal or a plurality of emission signals.

The method 300 of FIG. 10 can also include a step 304 of creating, by the processor, a second-order signal matrix of size N×N from the at least one digital signal waveform. The second-order signal matrix has a main diagonal whose $n^{th}$ element is expressed in terms of the square of the $n^{th}$ sample of each digital signal waveform, where n is an integer ranging from 1 to N.

The method 300 of FIG. 10 can further include a step 306 of deriving, by the processor, time-of-flight information associated with the one or more echoes based on the second-order signal matrix, the time-of-flight information being indicative of range information associated with the one or more targets. It should be noted that the creating step 304 and the deriving step 306 of the method 300 of FIG. 10 can include substeps and variants such as those described with respect to the creating step 108 and deriving step 110 of the method 100 of FIG. 1.

In some implementations, the method 300 can further include a step of outputting the time-of-flight information and/or the range information to another system or device and for different uses and purposes. Depending on the application, the outputted information can be used, for example, for navigation, driving assistance, geographic evaluation, presence detection, objection identification, collision avoidance, and the like. Furthermore, depending on the application, the method 300 may, for example, be implemented in an embedded or cloud-based system or platform. In addition, the time-of-flight and/or range information may be outputted directly to a user or be transmitted to another system or device configured to process the time-of-flight and/or range information in a way that adds value to the information. This processed information may then be communicated and made available to a user.

In accordance with another aspect, there is provided a computer device for detecting and ranging one or more targets within a scene, exemplary embodiments of which are illustrated FIGS. 2 and 3. In this embodiment, the computer device 232 includes a processor 228 and a processor and a non-transitory computer readable storage medium 230 operably connected to the processor 228. The non-transitory computer readable storage medium 230 has stored thereon computer readable instructions that, when executed by the processor 228, cause the processor 228 to perform the computer-implemented method disclosed herein, a possible embodiment of which is illustrated in FIG. 10.

Of course, numerous modifications could be made to the embodiments described above without departing from the scope of the appended claims.

The invention claimed is:

1. A method for detecting and ranging one or more targets within a scene, the method comprising:
   emitting, from an emitter, at least one emission signal onto the scene, each emission signal having a respective emission time;
   receiving, by a receiver, at least one return signal in response to the at least one emission signal, each return signal comprising one or more echoes to be detected produced by reflection of the respective emission signal from the one or more targets; and
   converting, by an analog-to-digital converter, the at least one return signal into at least one respective digital signal waveform, each digital signal waveform including a set of N real-valued samples representing the respective return signal at a set of N sequential sampling times elapsed after the emission time of the respective emission signal;
   creating, by a processor, a second-order signal matrix of size N×N from the at least one digital signal waveform, the second-order signal matrix having a main diagonal whose $n^{th}$ element is expressed in terms of the square of the $n^{th}$ sample of each digital signal waveform, where n is an integer ranging from 1 to N; and
   deriving, by the processor, time-of-flight information associated with the one or more echoes based on the second-order signal matrix, the time-of-flight information being indicative of range information associated with the one or more targets.

2. The method of claim 1, wherein the emitting step comprises emitting each emission signal as a single laser pulse or a series of laser pulses.

3. The method of claim 1, wherein the at least one emission signal consists of a single emission signal.

4. The method of claim 1, wherein the at least one emission signal consists of a plurality of emission signals.

5. The method of claim 4, wherein the plurality of emission signals ranges between two and sixteen emission signals.

6. The method of claim 4, wherein the emitting step comprises emitting the plurality of emission signals at a repetition frequency ranging from about 10 hertz to about 300 kilohertz.

7. The method of claim 4, wherein the $n^{th}$ element of the main diagonal of the second-order signal matrix is expressed in terms of the sum of the squares of the $n^{th}$ samples of the plurality of digital signal waveforms.

8. The method of claim 1, wherein the emitting step comprises emitting the at least one emission signal in a wavelength range of between about 380 nanometers and about 1550 nanometers.

9. The method of claim 1, wherein N ranges from about 256 to about 2048.

10. The method of claim 1, wherein the converting step comprises sampling the at least one return signal at an effective sampling frequency ranging from about 400 megasamples per second to about 2 gigasamples per second.

11. The method of claim 1, wherein the creating step comprises obtaining the second-order signal matrix as a matrix product of a first matrix of size N×K and a second matrix of size K×N, wherein each digital signal waveform is a column of the first matrix and a corresponding row of the second matrix, K being a positive integer equal to the number of the at least one digital signal waveform.

12. The method of claim 1, wherein the creating step comprises performing an echo decorrelation operation to attenuate or suppress off-diagonal content in the second-order signal matrix.

13. The method of claim 1, wherein the creating step comprises:
forming an initial second-order matrix of size N×N from the at least one digital signal waveform, the initial second-order matrix having a main diagonal whose $n^{th}$ element is expressed in terms of the square of the $n^{th}$ sample of each digital signal waveform, where n is an integer ranging from 1 to N; and
performing an echo decorrelation operation on the initial second-order matrix by reducing off-diagonal elements of the initial second-order matrix to obtain the second-order signal matrix.

14. The method of claim 13, wherein:
forming the initial second-order matrix comprises creating each secondary diagonal of the initial second-order matrix using either a subset of the elements on the main diagonal or one or more interpolations between adjacent elements on the main diagonal; and
performing the echo decorrelation operation on the initial second-order matrix comprises applying an amplitude modulation to the initial second-order matrix by multiplying each element by a modulation factor having a value that decreases as the distance between the element and the main diagonal increases.

15. The method of claim 14, wherein the value of the modulation factor decreases on either side of the main diagonal according to a modulation function selected in accordance with a shape of the at least one emission signal.

16. The method of claim 13, wherein:
forming the initial second-order matrix comprises obtaining the initial second-order matrix as a matrix product of a first matrix of size N×K and a second matrix of size K×N, wherein each digital signal waveform is a column of the first matrix and a corresponding row of the second matrix, K being a positive integer equal to the number of the at least one digital signal waveform; and
performing the echo decorrelation operation on the initial second-order matrix comprises obtaining the second-order signal matrix as a Hadamard product of the initial second-order matrix and a conditioning matrix G.

17. The method of claim 16, wherein the conditioning matrix G is a band matrix of size N×N in which the element $G(i,j)$ is equal to 1 if $|i-j|\leq B$ and 0 elsewhere, where i and j are integers ranging from 1 to N, and B is a bandwidth parameter of the band matrix.

18. The method of claim 16, wherein the conditioning matrix G is given by the expression $G=\Sigma_{\tau=1}^{N}a(\tau_n)a^{T}(\tau_n)$, where the $a(\tau_n)$ is a model vector of size N×1 representing a model of an echo waveform having a time of arrival $\tau_n$ corresponding to the $n^{th}$ sampling time of the set of N sequential sampling times, and the superscript T denotes a transpose operator.

19. The method of claim 1, wherein the deriving step comprises:
performing an eigendecomposition of the second-order signal matrix;
generating a time-domain pseudo-spectrum based on the eigendecomposition;
detecting one or more peaks in the time-domain pseudo-spectrum; and
determining the time-of-flight information associated with the one or more echoes based on the detected one or more peaks.

20. The method of claim 19, wherein generating the time-domain pseudo-spectrum comprises:
providing a model vector of N elements representing an echo waveform model having an adjustable time of arrival;
generating a noise subspace projector from the eigendecomposition; and
projecting the model vector onto the noise subspace projector while varying the time of arrival of the echo waveform model in a range defined from the set of N sequential sampling times.

21. The method of claim 20, wherein performing the eigendecomposition of the second-order signal matrix comprises generating a set of N eigenvalues and a corresponding set of N eigenvectors for the second-order signal matrix, and generating the noise subspace projector comprises:
identifying one or more eigenvalues among the N eigenvalues as one or more signal eigenvalues associated with the one or more echoes to be detected in the at least one return signal;
determining a signal subspace from the eigenvectors corresponding to the signal eigenvalues; and
obtaining the noise subspace projector as the orthogonal complement of the signal subspace.

22. The method of claim 21, wherein identifying the one or more signal eigenvalues comprises selecting the one or more signal eigenvalues using a threshold-based criterion.

23. A computer-implemented method for detecting and ranging one or more targets within a scene, the method comprising:
receiving, by a processor, at least one digital signal waveform digitized from at least one respective return signal received in response to at least one emission signal emitted onto the scene, each at a respective emission time, each return signal comprising one or more echoes to be detected produced by reflection of the respective at least one emission signal from the one or more targets, each digital signal waveform including a set of N real-valued samples representing the respective return signal at a set of N sequential sampling times elapsed after the emission time of the respective emission signal;

creating, by the processor, a second-order signal matrix of size N×N from the at least one digital signal waveform, the second-order signal matrix having a main diagonal whose $n^{th}$ element is expressed in terms of the square of the $n^{th}$ sample of each digital signal waveform, where n is an integer ranging from 1 to N; and deriving, by the processor, time-of-flight information associated with the one or more echoes based on the second-order signal matrix, the time-of-flight information being indicative of range information associated with the one or more targets.

24. The computer-implemented method of claim 23, wherein the at least one emission signal consists of a single emission signal.

25. The computer-implemented method of claim 23, wherein the at least one emission signal consists of a plurality of emission signals.

26. The computer-implemented method of claim 25, wherein the $n^{th}$ element of the main diagonal of the second-order signal matrix is expressed in terms of the sum of the squares of the $n^{th}$ samples of the plurality of digital signal waveforms.

27. The computer-implemented method of claim 23, wherein the creating step comprises obtaining the second-order signal matrix as a matrix product of a first matrix of size N×K and a second matrix of size K×N, wherein each digital signal waveform is a column of the first matrix and a corresponding row of the second matrix, K being a positive integer equal to the number of the at least one digital signal waveform.

28. The computer-implemented method of claim 23, wherein the creating step comprises performing an echo decorrelation operation to attenuate or suppress off-diagonal content in the second-order signal matrix.

29. The computer-implemented method of claim 23, wherein the creating step comprises:

forming an initial second-order matrix of size N×N from the at least one digital signal waveform, the initial second-order matrix having a main diagonal whose $n^{th}$ element is expressed in terms of the square of the $n^{th}$ sample of each digital signal waveform, where n is an integer ranging from 1 to N; and performing an echo decorrelation operation on the initial second-order matrix by reducing off-diagonal elements of the initial second-order matrix to obtain the second-order signal matrix.

30. The computer-implemented method of claim 29, wherein:

forming the initial second-order matrix comprises creating each secondary diagonal of the initial second-order matrix using either a subset of the elements on the main diagonal or one or more interpolations between adjacent elements on the main diagonal; and performing the echo decorrelation operation on the initial second-order matrix comprises applying an amplitude modulation to the initial second-order matrix by multiplying each element by a modulation factor having a value that decreases as the distance between the element and the main diagonal increases.

31. The computer-implemented method of claim 30, wherein the value of the modulation factor decreases on either side of the main diagonal according to a modulation function selected in accordance with a shape of the at least one emission signal.

32. The computer-implemented method of claim 29, wherein:

forming the initial second-order matrix comprises obtaining the initial second-order matrix as a matrix product of a first matrix of size N×K and a second matrix of size K×N, wherein each digital signal waveform is a column of the first matrix and a corresponding row of the second matrix, K being a positive integer equal to the number of the at least one digital signal waveform; and performing the echo decorrelation operation on the initial second-order matrix comprises obtaining the second-order signal matrix as a Hadamard product of the initial second-order matrix and a conditioning matrix G.

33. The computer-implemented method of claim 32, wherein the conditioning matrix G is a band matrix of size N×N in which the element G(i,j) is equal to 1 if $|i-j| \leq B$ and 0 elsewhere, where i and j are integers ranging from 1 to N, and B is a bandwidth parameter of the band matrix.

34. The computer-implemented method of claim 32, wherein the conditioning matrix G is given by the expression $G=\Sigma_{\tau=1}^{N} a(\tau_n) a^T(\tau_n)$, where the $a(\tau_n)$ is a model vector of size N×1 representing a model of an echo waveform having a time of arrival $\tau_n$ corresponding to the $n^{th}$ sampling time of the set of N sequential sampling times, and the superscript T denotes a transpose operator.

35. The computer-implemented method of claim 23, wherein the deriving step comprises:

performing an eigendecomposition of the second-order signal matrix;

generating a time-domain pseudo-spectrum based on the eigendecomposition;

detecting one or more peaks in the time-domain pseudo-spectrum; and determining the time-of-flight information associated with the one or more echoes based on the detected one or more peaks.

36. The computer-implemented method of claim 35, wherein generating the time-domain pseudo-spectrum comprises:

providing a model vector of N elements representing an echo waveform model having an adjustable time of arrival;

generating a noise subspace projector from the eigendecomposition; and projecting the model vector onto the noise subspace projector while varying the time of arrival of the echo waveform model in a range defined from the set of N sequential sampling times.

37. The computer-implemented method of claim 36, wherein performing the eigendecomposition of the second-order signal matrix comprises generating a set of N eigenvalues and a corresponding set of N eigenvectors for the second-order signal matrix, and generating the noise subspace projector comprises:

identifying one or more eigenvalues among the N eigenvalues as one or more signal eigenvalues associated with the one or more echoes to be detected in the at least one return signal;

determining a signal subspace from the eigenvectors corresponding to the signal eigenvalues; and obtaining the noise subspace projector as the orthogonal complement of the signal subspace.

38. The computer-implemented method of claim 37, wherein identifying the one or more signal eigenvalues comprises selecting the one or more signal eigenvalues using a threshold-based criterion.

39. A non-transitory computer readable storage medium having stored thereon computer readable instructions that, when executed by a processor, cause the processor to perform the computer-implemented method of claim 23.

40. A computer device for detecting and ranging one or more targets within a scene, the computer device comprising:
   a processor; and
   a non-transitory computer readable storage medium operably connected to the processor, the non-transitory computer readable storage medium having stored thereon computer readable instructions that, when executed by the processor, cause the processor to perform the computer-implemented method of claim 23.

41. A system for detecting and ranging one or more targets within a scene, the system comprising:
   an emitter to emit an emission signal onto the scene at an emission time;
   a receiver to receive a return signal in response to the emission signal, the return signal comprising one or more echoes to be detected produced by reflection of the emission signal from the one or more targets; and
   an analog-to-digital converter coupled to the receiver and configured to convert the return signal into a digital signal waveform, the digital signal waveform including a set of N real-valued samples representing the return signal at a set of N sequential sampling times elapsed after the emission time of the emission signal; and
   a processor coupled to the analog-to-digital converter and configured to:
      create a second-order signal matrix of size N×N from the digital signal waveform, the second-order signal matrix having a main diagonal whose $n^{th}$ element is expressed in terms of the square of the $n^{th}$ sample of the digital signal waveform, where n is an integer ranging from 1 to N; and
      derive time-of-flight information associated with the one or more echoes based on the second-order signal matrix, the time-of-flight information being indicative of range information associated with the one or more targets.

42. The system of claim 41, wherein the emitter is a pulsed laser source.

43. The system of claim 41, wherein the emitter is configured to emit the emission signal in a wavelength range of between about 380 nanometers and about 1550 nanometers.

44. The system of claim 41, wherein the emitter is configured to emit the emission signal at a repetition frequency ranging from about 10 hertz to about 300 kilohertz.

45. The system of claim 41, wherein the system is a lidar system.

46. The system of claim 41, wherein the analog-to-digital converter is configured to sample the return signal at an effective sampling frequency ranging from about 400 megasamples per second to about 2 gigasamples per second.

47. The system of claim 41, wherein the processor is configured to create the second-order signal matrix as a matrix product of a first matrix of size N×K and a second matrix of size K×N, wherein the digital signal waveform is a column of the first matrix and a corresponding row of the second matrix, K being a positive integer equal to the number of the at least one digital signal waveform.

48. The system of claim 41, wherein the processor is configured to create the second-order signal matrix by performing an echo decorrelation operation to attenuate or suppress off-diagonal content in the second-order signal matrix.

49. The system of claim 41, wherein the processor is configured to create the second-order signal matrix by:
   forming an initial second-order matrix of size N×N from the digital signal waveform, the initial second-order matrix having a main diagonal whose $n^{th}$ element is expressed in terms of the square of the $n^{th}$ sample of the digital signal waveform, where n is an integer ranging from 1 to N; and
   performing an echo decorrelation operation on the initial second-order matrix by reducing off-diagonal elements of the initial second-order matrix to obtain the second-order signal matrix.

50. The system of claim 49, wherein the processor is configured to:
   form the initial second-order matrix by creating each secondary diagonal of the initial second-order matrix using either a subset of the elements on the main diagonal or one or more interpolations between adjacent elements on the main diagonal; and
   perform the echo decorrelation operation on the initial second-order matrix by applying an amplitude modulation to the initial second-order matrix by multiplying each element of the initial second order matrix by a modulation factor having a value that decreases as the distance between the element and the main diagonal increases.

51. The system of claim 49, wherein the processor is configured to:
   form the initial second-order matrix as a matrix product of a first matrix of size N×K and a second matrix of size K×N, wherein the digital signal waveform is a column of the first matrix and a corresponding row of the second matrix, K being a positive integer equal to the number of the digital signal waveform; and
   perform the echo decorrelation operation on the initial second-order matrix comprises by obtaining the second-order signal matrix as a Hadamard product of the initial second-order matrix and a conditioning matrix G, wherein the conditioning matrix G is given by the expression $G=\Sigma_{\tau=1}^{N} a(\tau_n)a^T(\tau_n)$, where the $a(\tau_n)$ is a model vector of size N×1 representing a model of an echo waveform having a time of arrival $\tau_n$ corresponding to the $n^{th}$ sampling time of the set of N sequential sampling times, and the superscript T denotes a transpose operator.

52. The system of claim 41, wherein the processor is configured to derive the time-of-flight information by:
   performing an eigendecomposition of the second-order signal matrix;
   generating a time-domain pseudo-spectrum based on the eigendecomposition;
   detecting one or more peaks in the time-domain pseudo-spectrum; and
   determining the time-of-flight information associated with the one or more echoes based on the detected one or more peaks.

* * * * *